United States Patent
Pax et al.

(10) Patent No.: US 11,909,166 B2
(45) Date of Patent: Feb. 20, 2024

(54) LARGE-MODE-AREA OPTICAL FIBERS AND OPTICAL FIBER AMPLIFIERS IN THE EYE-SAFE REGIME

(71) Applicant: Lawrence Livermore National Security, LLC, Livermore, CA (US)

(72) Inventors: Paul H. Pax, Livermore, CA (US); Jay W. Dawson, Livermore, CA (US); Victor V. Khitrov, San Ramon, CA (US); Cody W. Mart, Livermore, CA (US); Michael J. Messerly, Danville, CA (US); Michael Runkel, Livermore, CA (US); Charles X. Yu, Pleasanton, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 228 days.

(21) Appl. No.: 17/317,752

(22) Filed: May 11, 2021

(65) Prior Publication Data
US 2021/0359484 A1  Nov. 18, 2021

Related U.S. Application Data

(60) Provisional application No. 63/023,414, filed on May 12, 2020.

(51) Int. Cl.
*H01S 3/067* (2006.01)
*H01S 3/30* (2006.01)
*G02B 6/02* (2006.01)

(52) U.S. Cl.
CPC ...... *H01S 3/06737* (2013.01); *G02B 6/02042* (2013.01); *H01S 3/06716* (2013.01); *H01S 3/06725* (2013.01); *H01S 3/302* (2013.01)

(58) Field of Classification Search
CPC ............ H01S 3/06737; H01S 3/06716; H01S 3/06725; H01S 3/302; H01S 3/06733;
(Continued)

(56) References Cited

U.S. PATENT DOCUMENTS 7,835,608 B2 * 11/2010 Minelly ............. G02B 6/03644
385/144
9,172,208 B1  10/2015 Dawson et al.
(Continued)

FOREIGN PATENT DOCUMENTS

KR  10-2019-0056780 A  5/2019
KR  2019-0056780  *  5/2019  ............... G02B 6/02
(Continued)

OTHER PUBLICATIONS

Bloembergen, N., Bret, G., Lallemand, P., Pino, A., & Simova, P. (1967). Controlled stimulated Raman amplification and oscillation in hydrogen gas. IEEE Journal of Quantum Electronics, 3(5), 197-201.
(Continued)

*Primary Examiner* — Xinning(Tom) Niu
(74) *Attorney, Agent, or Firm* — KNOBBE MARTENS OLSON & BEAR LLP

(57) ABSTRACT

The present technology provides large mode area optical fibers engineered to have normal dispersion around 1600 nm, enabling high power Raman amplification at eye safer wavelengths. The fibers can have a main core and one or more side cores disposed relative to the main core so that modes of the main core and the one or more side cores hybridize into supermodes with modified dispersion.

20 Claims, 12 Drawing Sheets

(58) Field of Classification Search
CPC ........... H01S 3/08045; H01S 3/094053; H01S 3/094069; H01S 3/09415; H01S 3/06758; G02B 6/02042

See application file for complete search history.

(56) References Cited

U.S. PATENT DOCUMENTS

| | | | |
|---|---|---|---|
| 9,450,373 B2 | 9/2016 | Heebner et al. | |
| 2005/0069269 A1* | 3/2005 | Libori | G02B 6/03627 385/125 |
| 2005/0254764 A1* | 11/2005 | Chatigny | H01S 3/06708 385/123 |
| 2007/0177846 A1* | 8/2007 | Chen | C03B 37/01413 385/127 |
| 2011/0020008 A1 | 1/2011 | Dong et al. | |
| 2013/0016949 A1* | 1/2013 | Yao | G02B 6/02042 385/126 |
| 2017/0085051 A1* | 3/2017 | Thomsen | G02B 6/03633 |

FOREIGN PATENT DOCUMENTS

| | | |
|---|---|---|
| WO | WO 2016-137344 A1 | 9/2016 |
| WO | WO-2016137344 A1 * | 9/2016 ......... G02B 6/02042 |

OTHER PUBLICATIONS

Goldhar, J., Taylor, M., & Murray, J. (1984). An efficient double-pass Raman amplifier with pump intensity averaging in a light guide. IEEE journal of quantum electronics, 20(7), 772-785.

Heebner, J. E., Sridharan, A. K., Dawson, J. W., Messerly, M. J., Pax, P. H., Shverdin, M. Y., . . . & Barty, C. P. (2010). High brightness, quantum-defect-limited conversion efficiency in cladding-pumped Raman fiber amplifiers and oscillators. Optics express, 18(14), 14705-14716.

Marcuse, D. (1979). Interdependence of waveguide and material dispersion. Applied optics, 18(17), 2930-2932.

International Search Report and Written Opinion in PCT/US2021/031763 dated Aug. 30, 2021 in 11 pages.

Baskiotis, et al., "LMA effectively single-mode thulium doped fibre with normal dispersion at wavelengths around 2um," IEEE, 2013, in 1 page.

Gérôme, et al., "Theoretical and Experimental Analysis of a Chromatic Dispersion Compensating Module Using a Dual Concentric Core Fiber," Journal of Lightwave Technology, vol. 24, No. 1, Jan. 2006, in 7 pages.

Huttunen, et al., "Optimization of dual-core and microstructure fiber geometries for dispersion compensation and large mode area," vol. 13, No. 2, Optics Express 627, dated Jan. 24, 2005, in 9 pages.

Jain, et al., "Highly efficient Yb-free Er—La—Al doped ultralow NA large mode area single-trench fiber laser," OSA, dated Oct. 20, 2015 in 6 pages.

Saitoh, et al., "Theoretical realization of holey fiber with flat chromatic dispersion and large mode area: an intriguing defected approach," Optics Letters, vol. 31, No. 1, dated Jan. 1, 2006 in 3 pages.

Sivabalan, et al., "High Normal Dispersion and Large Mode Area Photonic Quasi-Crystal Fiber Stretcher," IEEE Photonics Technology Letters, vol. 23, No. 16, dated Aug. 15, 2011, in 3 pages.

Thyagarajan, et al., "A Novel Design of a Dispersion Compensating Fiber," IEEE Photonics Technology Letters, vol. 8, No. 11, Nov. 1996, in 3 pages.

* cited by examiner

LARGE-MODE-AREA OPTICAL FIBERS AND OPTICAL FIBER AMPLIFIERS IN THE EYE-SAFE REGIME

CROSS-REFERENCE TO RELATED APPLICATIONS

This application claims the benefit under 35 U.S.C. § 119(e) of U.S. Provisional Patent Application No. 63/023,414, filed May 12, 2020, and titled LARGE-MODE-AREA PULSED FIBER AMPLIFIERS IN THE EYE-SAFE REGIME. The entirety contents of each of the above-identified application(s) are hereby incorporated by reference herein and made part of this specification for all that they disclose.

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field of the Disclosure

Some embodiments disclosed herein relate to optical fibers and to optical amplifiers (referred to herein as fibers and amplifiers respectively), such as large-mode-area pulsed or high power continuous wave (CW) fiber amplifiers.

Description of the Related Art

Fiber lasers and amplifiers are desirable because of their compactness and high efficiency. However, in order to obtain multi-kW power level, both average power in the CW case and peak power in the pulsed case, the fiber having a large mode field diameter (e.g., 20 microns and above) may be desirable to mitigate fiber nonlinearity. In the eye-safe wavelength regime (1.45 µm and above), fused silica has anomalous (negative) material dispersion that further aggravates the nonlinear penalty via modulational instability (MI). MI is well-known to induce temporal breakup and white light generation. MI can result in generation of additional spectral components and consequent loss of energy into other spectral components, which reduces the efficiency of lasers and amplifiers designed to output light at a particular wavelength or wavelengths. Simple step index fibers based on fused silica cross from normal to anomalous dispersion somewhere near 1300 nm, undermining their use with Stimulated Raman scattering (SRS) in the important eye-safe region of the spectrum. However, for high power fiber lasers large mode fields are desirable. In such fibers, the dispersion is dominated by the material dispersion of fused silica and the anomalous dispersion in the eye-safe region. Therefore, robust operation of the fiber in the normal dispersion regime can be difficult to achieve.

SUMMARY

Certain example embodiments are summarized below for illustrative purposes. The embodiments are not limited to the specific implementations recited herein. Embodiments may include several novel features, no single one of which is solely responsible for its desirable attributes or which is essential to the embodiments.

Various implementations of advantageous technology described herein includes optical fibers that have normal dispersion in the eye-safe regime, for use in telecommunications, for in-fiber pulse stretching or compressing and in Large Mode Area (LMA) fibers for high power or pulse energy applications. At least some schemes rely on modifying the waveguide dispersion of the fiber such that the net dispersion (material dispersion plus waveguide dispersion) is normal (positive $\beta_2$, or negative dispersion parameter D). Various implementations of advantageous technology described herein includes a Large Mode Area (LMA) fiber engineered to have normal dispersion around 1600 nm, enabling high power Raman amplification at these eye safer wavelengths. Various implementations of the technology described herein may be useful for high power Raman fiber amplification in spectral regions (including eye safer wavelengths) where other fibers would have anomalous dispersion. Exemplary embodiments of these specialized laser sources may have applications in additive manufacturing, remote sensing and power beaming.

Various implementations of this technology employ mode hybridization to convert otherwise anomalous dispersion into normal dispersion in the wavelength range of interest. For example, to make use of mode hybridization between core elements, embodiments of the technology use a low number of small isolated auxiliary waveguides or side cores, which guide only a few modes and modify the dispersion without carrying too much power outside the main core. This allows the fiber to operate in the normal dispersion regime while maintaining large mode diameter (>20 microns) and is applicable to eye safe amplifiers including Erbium (Er), Thulium (Tm) and Neodymium (Nd).

Some embodiments of the technology can be directed to LMA fiber designs that additionally include higher order mode (HOM) suppression. In addition to dispersion modifying elements, the fiber may include elements whose function is to discriminate against, suppress, reduce or inhibit the HOMs by altering the confinement loss, mode effective area, effective index difference, or other characteristics of the HOM's. One such HOM suppression fiber design described herein is a trench fiber, which can include a main central core such as a step index core surrounded by a ring of high index material possibly having an index equal to the step index core, separated by the trench (e.g., having a lower index in comparison to the step index core and ring). The outer ring serves to delocalize the HOM from the main central (e.g., step index) core and makes propagation of the HOMs in the main central core more lossy. The trench fiber design can be used with the auxiliary or side core dispersion modifying elements disclosed herein. An example trench fiber can have a very large core size of 50 microns diameter, for operation around 1600 nm. By itself (e.g., without the auxiliary or side cores elements and without the ring), the core in cladding can support multiple higher order modes (HOM) in addition to the fundamental mode, with undesirable anomalous dispersion. However, with the auxiliary or side core dispersion modifying elements and the HOM suppressing outer ring, the HOMs can be at least partially suppressed and the fundamental mode can have desirable normal dispersion.

The fiber designs provided herein have the further advantage of achieving normal dispersion over a 100 nm wavelength regime. This consideration can be especially important for Raman amplification. Laser driven Stimulated Raman Scattering (SRS) is a well-developed nonlinear optics method for generating new wavelengths, signal amplification and brightness enhancement. Fiber waveguides present a particularly attractive SRS platform because of their high beam quality, and the great length over which high intensities can be maintained. The latter can be especially important in that it enables SRS based devices at net total powers relevant to telecommunication and power beaming applications.

In a fused silica Raman amplifier, the pump and signal wavelengths are only spaced by ~100 nm apart and can both experience anomalous dispersion. Therefore, having a 100 nm normal dispersion window (e.g., 100 nm or greater) can be useful to enable both pump and signal wavelength to be less affected or even unaffected by modulational instability.

Various embodiments of the technology described herein can include a silica-based fiber engineered for normal dispersion at eye-safer wavelengths. One or several high index (e.g., higher than the cladding) auxiliary or side core elements can be used to modify dispersion. The fiber can be arranged to carry power predominantly in the main core and to support a Large Mode Area in the main core.

Embodiments of the technology further include fiber amplifiers with normal dispersion at eye-safer wavelengths based on such engineered fiber designs. Some embodiments of the technology further include a silica-based Raman fiber amplifier with normal dispersion at eye-safer wavelengths. The fiber may include one or several identical auxiliary elements or side core elements to modify dispersion. One or several differing auxiliary elements or side core elements can also be used to modify dispersion at a multiplicity of wavelengths. Some of the auxiliary or side core elements may be the same and some may be different. In various implementations, only a small number of such auxiliary or side core are used. The side core elements may be disposed about the main or central (e.g., step index) core. In various implementations a sparse number (e.g., 10 or less, or 8 or less, or 6 or less or 5 or less, 4 or less, 3 or less, or possibly 2 side cores) are employed such that the side cores can be separated by sufficient distance from each other so as not to cause mode hybridization between the modes of the side cores. The fiber can be configured to support a Large Mode Area in the main core and in some implementations can include cladding scattering elements or surfaces (e.g., scalloped or textured surfaces) to enhance mixing and or pump absorption in cladding pumped fiber amplifiers.

BRIEF DESCRIPTION OF THE DRAWINGS

The accompanying drawings, which are incorporated into and form a part of the disclosure, illustrate embodiments of the technology and, together with the description, serve to explain the principles of the technology.

DETAILED DESCRIPTION OF CERTAIN EMBODIMENTS

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 1:
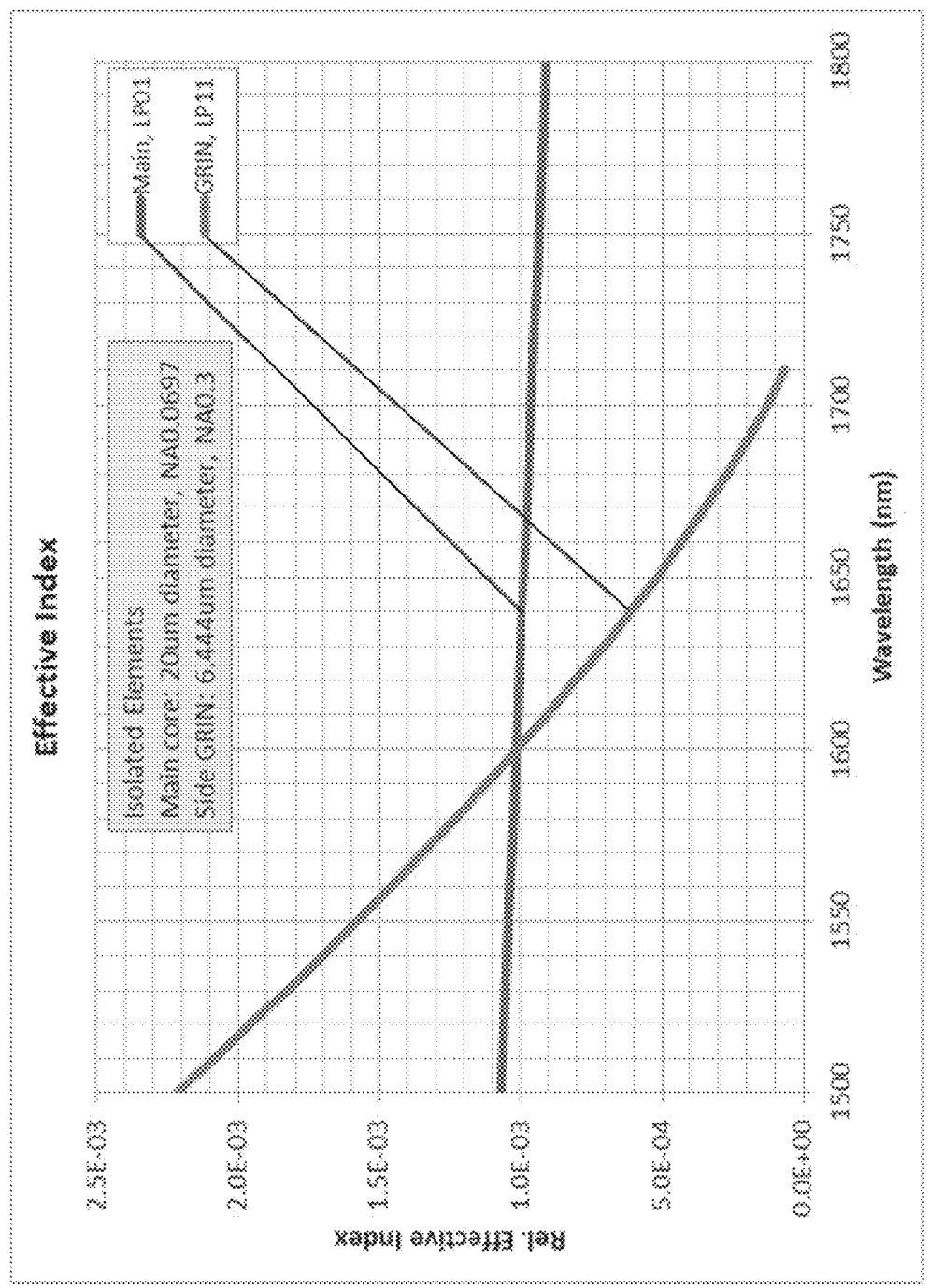
FIG. 1 shows the effective indices of the individual elements (e.g., main or central step index core and side core) of the structure, relative to the cladding. These effective index plots are for the main core alone in the cladding and the side core alone in the cladding respectively.
Figure 2:
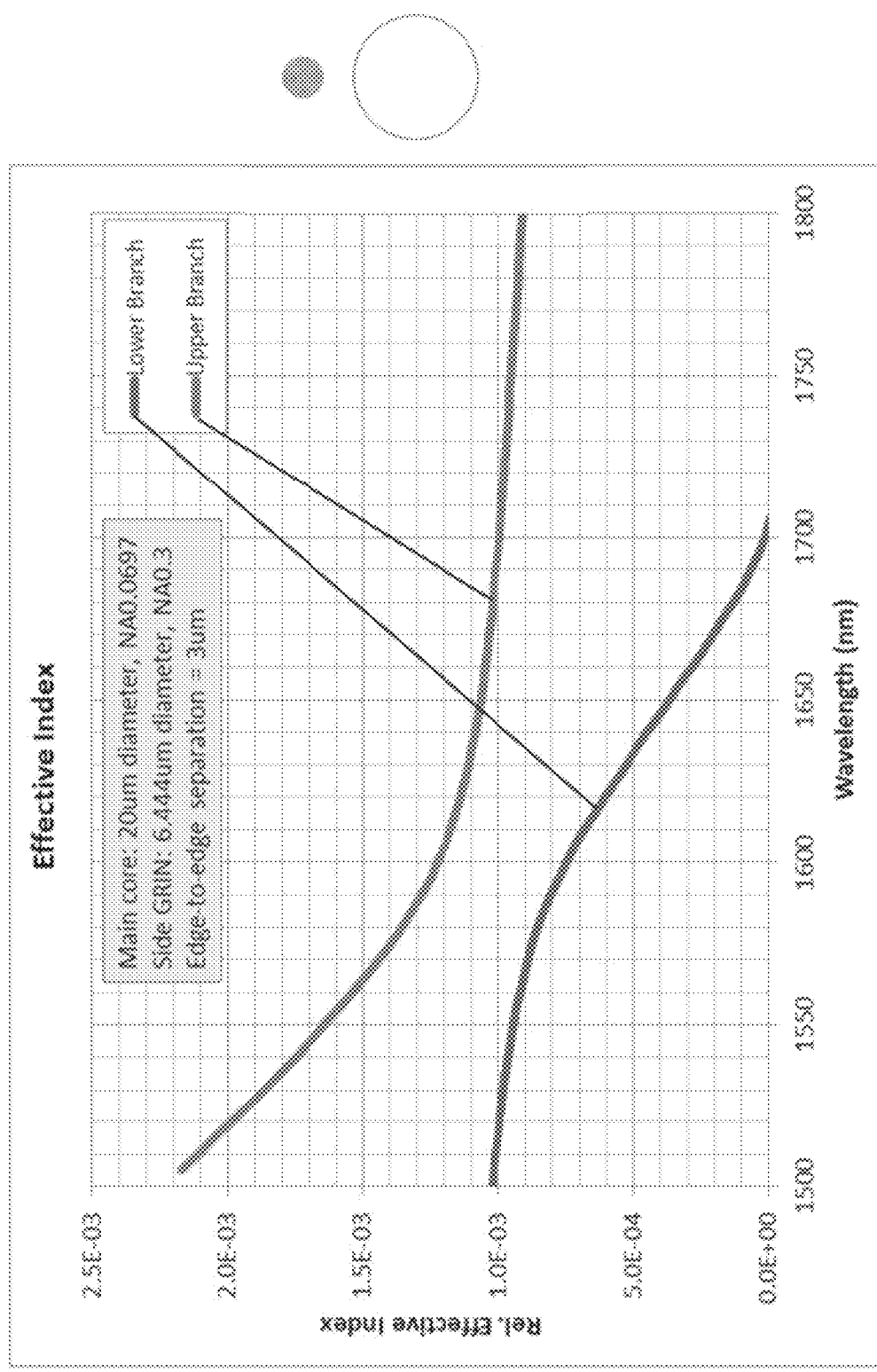
FIG. 2 shows the effective indices of the two hybridized modes ("supermodes") of the compound structure comprising the main core together with the side core in proximity thereto are disposed or embedded in the cladding as shown in the inset on the right hand side.

As discussed above, example designs of the present technology can make use of mode hybridization in a compound waveguide. The waveguide comprises a large, low index contrast feature, referred to as the Main Core, that is the main power carrying component; and one or several smaller high index contrast features, referred to as the Side Core, to modify the dispersion of the Main Core. The Main Core and the Side Core are disposed or embedded in a cladding and have a higher refractive index that the cladding. The main core and side core can have same or different indices of refraction with either higher or lower than the other. The main core may comprise a monolithic structure, a region of contiguous material embedded in the cladding (e.g. formed from a rod that is drawn to form the fiber). The main core may have a circular cross-section orthogonal to the length of the fiber and may have a diameter. The main core, however, need not have a circular cross-section. Similarly, an individual side core may comprise a monolithic structure, a region of contiguous material embedded in the cladding (e.g. formed from a rod that is drawn to form the fiber). The side core may have a circular cross-section orthogonal to the length of the fiber and may have a diameter. The side core, however, need not have a circular cross-section. The wavelength dependence of the effective indices of the modes of the two cores (Main Core and Side Core) in isolation (e.g., main core embedded in cladding without the side core(s), or side core embedded in cladding without the main core) will cross at a steep angle, as shown in FIG. 1. When the cores (main core and side core(s)) are placed in close proximity, however, their individual modes will hybridize into 'supermodes' whose effective indices have sharp kinks as a function of wavelength, as shown in FIG. 2. These kinks result in a strong modification of the structure's dispersion. In the example shown in FIG. 2, the design includes a main core and a single side core and the close proximity of the two results in mode hybridization with two supermodes resulting therefrom.

This effect is illustrated in the following example, where the index contrast is specified by Numerical Aperture (NA). In Silica based LMA fibers in the eye-safer wavelength region around 1600 nm, the fiber's silica background and the LMA core experience anomalous dispersion. In this example, the Main Core has a 20 μm diameter with NA ~0.07, which can be nearly single mode (LP01) when straight. In this embodiment, a single Side Core has a Graded Index (GRIN) parabolic profile (e.g., with peak at the center of the cross-section orthogonal to the length and falling off at the perimeter on both sides) with peak NA=0.3 and a diameter of around 6-7 μm, which can robustly support both the LP01 and LP11 modes. The GRIN's LP11 mode was chosen to modify the Main Core as its index variation is steeper than would be the LP01 mode in a Side Core size to match the Main Core at the design wavelength. FIG. 1 shows the effective indices of the relevant modes of the main core and the side core in isolation. The less steep curve, for example, corresponds to the mode resulting from the main core alone in cladding (without the side core). The steeper curve corresponds to the mode resulting from the side core alone in cladding (without the main core). Because the side core and the main core are not present together in the same structure, the mode hybridization that produced the supermodes is not present. In the absence of such mode hybridization, the two modes' effective indices would intersect at a wavelength of 1600 nm with the side core having a steeper or faster varying effective index than the effective index of the mode for the main core. As referenced above, the curve for the Main Core corresponds to the Main Core alone not integrated together with the Side Core in the same fiber. Similarly, the curve for the Side Core corresponds to the Side Core alone not integrated together with the Main Core in the same fiber. In this example, side core has a higher index contrast (and larger numeral aperture) than the main core. However, the main core has a larger lateral dimension (width and height of cross-section orthogonal to length of fiber) than the side core. That is, as both the main core and side cores have circular cross-sections orthogonal to the length of the fiber, the diameter of the main core is larger than the diameter of the side core (e.g., at least 2× larger, at least 3× greater).

Figure 8:
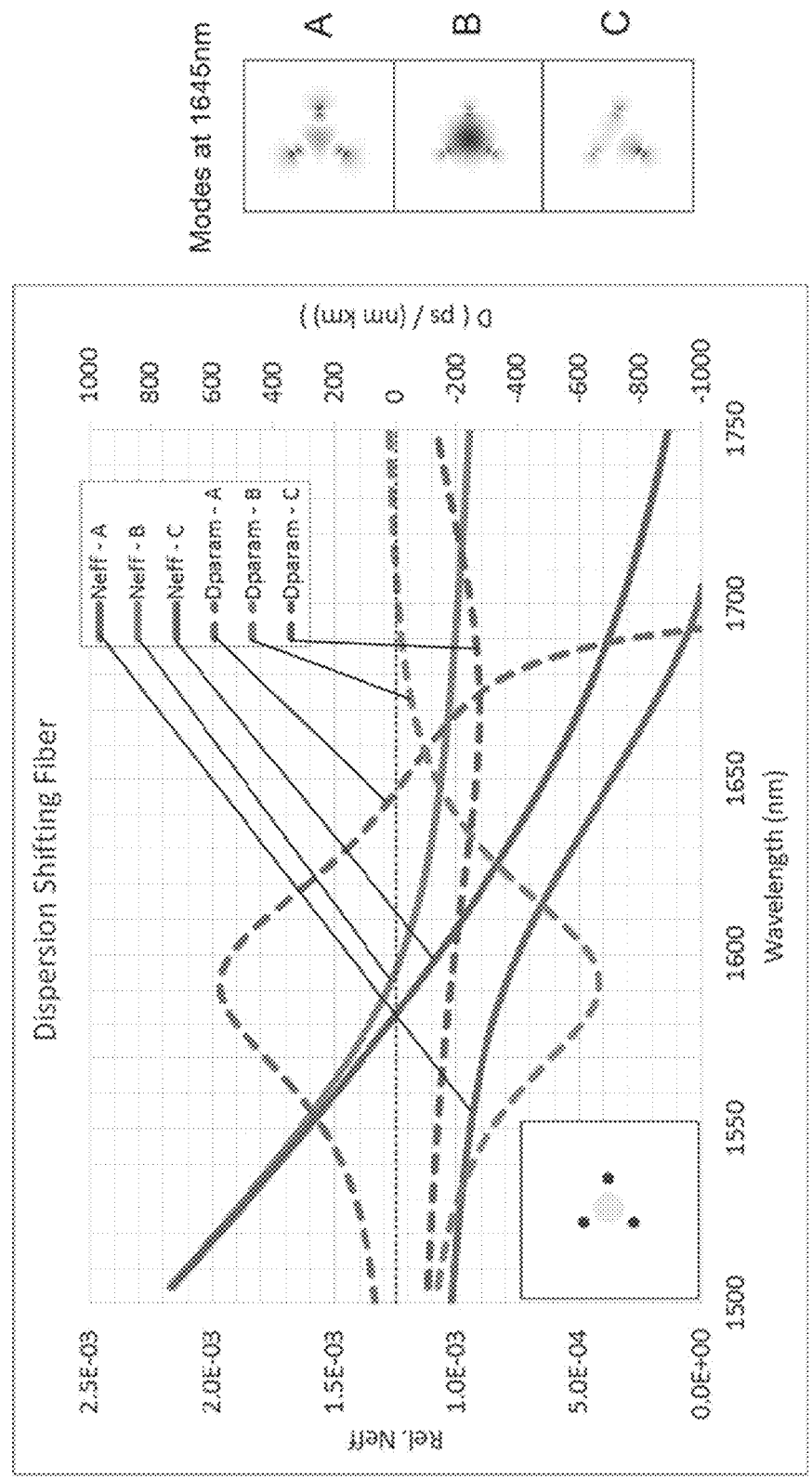
FIG. 8 shows the effective index and Dispersion parameter of the relevant supermodes of a structure with three identical auxiliary elements or side cores comprising graded index elements (GRINs). The inset (lower left) shows a sketch of the structure with the central main (e.g., step index) core surrounded by three side cores imbedded in a cladding, and the insert (right) shows the fields corresponding to the different supermodes at one preferred operating wavelength.
Figure 9:
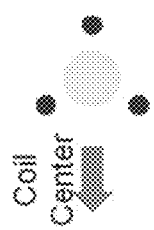
FIG. 9 shows the effect of coiling, in the first of two distinct orientations, on the effective index and Dispersion parameter of the structure of FIG. 8, along with the fields at one preferred operating wavelength.
Figure 9:
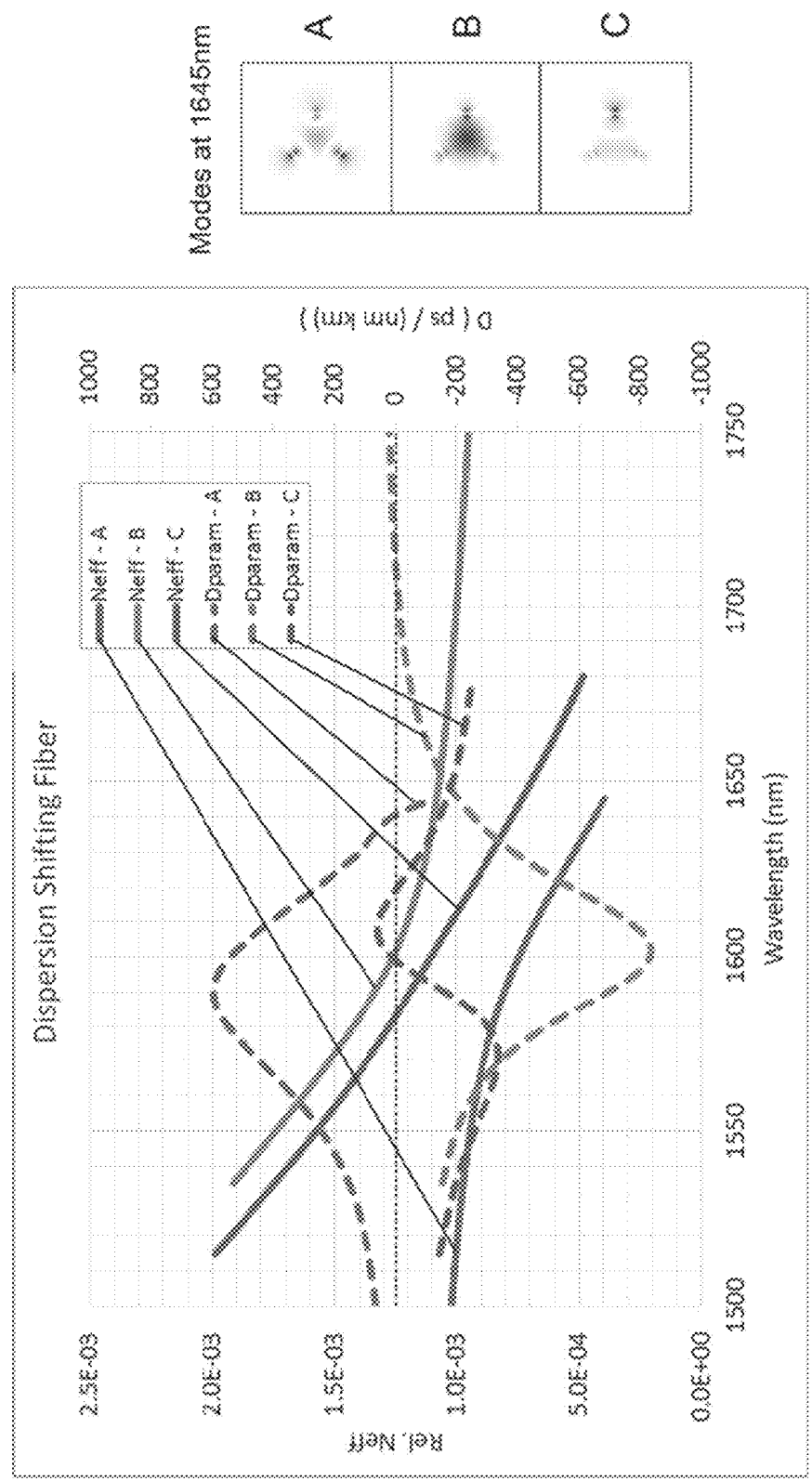
Figure 10:
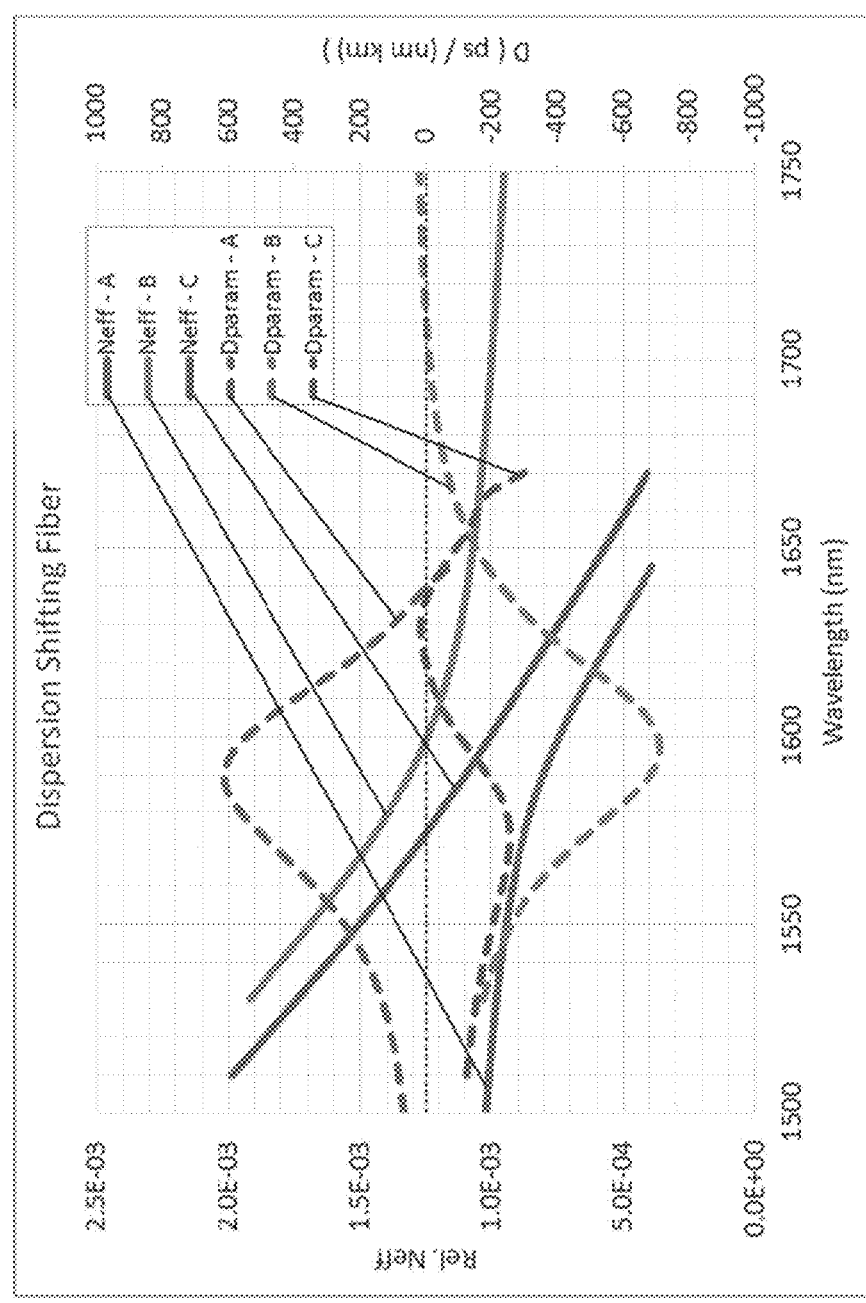
FIG. 10 shows the effect of coiling, in the second of two distinct orientations, on the effective index and Dispersion parameter of the structure of FIG. 8, along with the fields at one preferred operating wavelength.

When the Main and Side Cores are brought together (e.g., integrated into the same fiber, or within a threshold proximity), their modes hybridize, yielding supermodes. FIG. 2 is an example plot of effective index versus wavelength illustrating two super modes, one referred to as an upper branch and the other referred to as a lower branch. FIG. 2 shows that the supermodes have different characteristics depending on wavelength: at short wavelengths the lower branch resides mostly in the Main Core and the upper branch in the Side Core; the opposite is true at long wavelengths. This conclusion is demonstrated by the fact that the lower branch curve at low wavelength generally matches the curve corresponding to the main core in isolation (see FIG. 1) and at high wavelengths generally matches the curve corresponding to the side core in isolation (see FIG. 1). Conversely, the curve of the upper branch at low wavelength generally matches the curve corresponding to the side core in isolation (see FIG. 1) and at high wavelengths generally matches the curve corresponding to the main core in isolation (see FIG. 1). It is further demonstrated by calculating the fraction of power in the main core (FIG. 4), and by the calculated mode profiles (FIGS. 8-10).

Thus, various embodiments of the technology may utilize certain design rules. When the individual components (main core, side core) are placed in proximity, their modes hybridize around the wavelength at which their effective indices coincide, yielding supermodes with qualitatively different dispersion compared to the modes of the isolated components. This effect is most pronounced if the wavelength dependence of the effective indices of the modes of the isolated components are dissimilar, for instance if the main core's mode has a weak (shallow) wavelength dependence (e.g., the slope is smaller in magnitude) and the side core's mode has a strong (steep) wavelength dependence (e.g., the slope is larger in magnitude). For example, the slope of the wavelength dependence of the effective index for the side core mode can be 2 times, 3 times, 5 times, 7 times, 10 times, 12 times, 15 times, 20 times, 25 times steeper, 30 times steeper, 35 times steeper, 40 times steeper, or more, than the slope of the wavelength dependence of the effective index of the main core mode or any range formed by any of these values (e.g., from 3 times to 25 times) possibly where the lines cross or at the operating wavelength or at a wavelength of 1600 nm. In FIG. 1, the slope of the side core or GRIN mode (LP11) can be about 1, and the main core mode (LP01) can have a slope of about 1/20 at 1600 nm, where the lines cross. One of the two supermodes (e.g., the lower branch) develops an enhanced anomalous dispersion feature, making it undesirable. The other supermode (e.g., the upper branch) develops an enhanced normal dispersion feature, which is desirable for suppressing Modulation Instability at eye-safe wavelengths in a silica fiber. Also, the two supermodes have different levels of overlap with the main core at different wavelengths, with the result that the best operating wavelength is to the longer wavelength side of the enhanced normal dispersion feature. For example, at wavelengths of 1650 and higher, the curves of the upper branch more resemble the curve corresponding to the main core in isolation (see FIG. 1) than the side core in isolation (see FIG. 1), and/or the fraction of power can be high in the main core (FIG. 4), and/or the calculated mode profile can more clearly resembles that of the main core (FIGS. 8-10).

The resulting dispersion of the supermodes can be engineered (e.g., designed or optimized) by adjusting the following parameters:

1. Regarding the index and size of the two components (main core and side core), defining their modes' effective indices, their wavelength dependence, and the wavelength at which they are coincident.
    a. A main core of large size and low index has a shallow wavelength dependence, making it relatively insensitive to variations in size or index. This is a desirable feature in that a large core supports high power operation and insensitivity means that adjustments to the side core do not materially affect the (e.g., optimum) operating point of the main core.
    b. A side core of small size and high index has a steep wavelength dependence, increasing the effect on dispersion and making it relatively sensitive to variations in size or index, which can be desirable features.
2. Regarding the separation of the two components, affecting the magnitude and width of the supermodes' enhanced dispersion features:
   a. A small separation yields wide and small magnitude dispersion features.
   b. A large separation yields narrow and large magnitude dispersion features.

Figure 3:
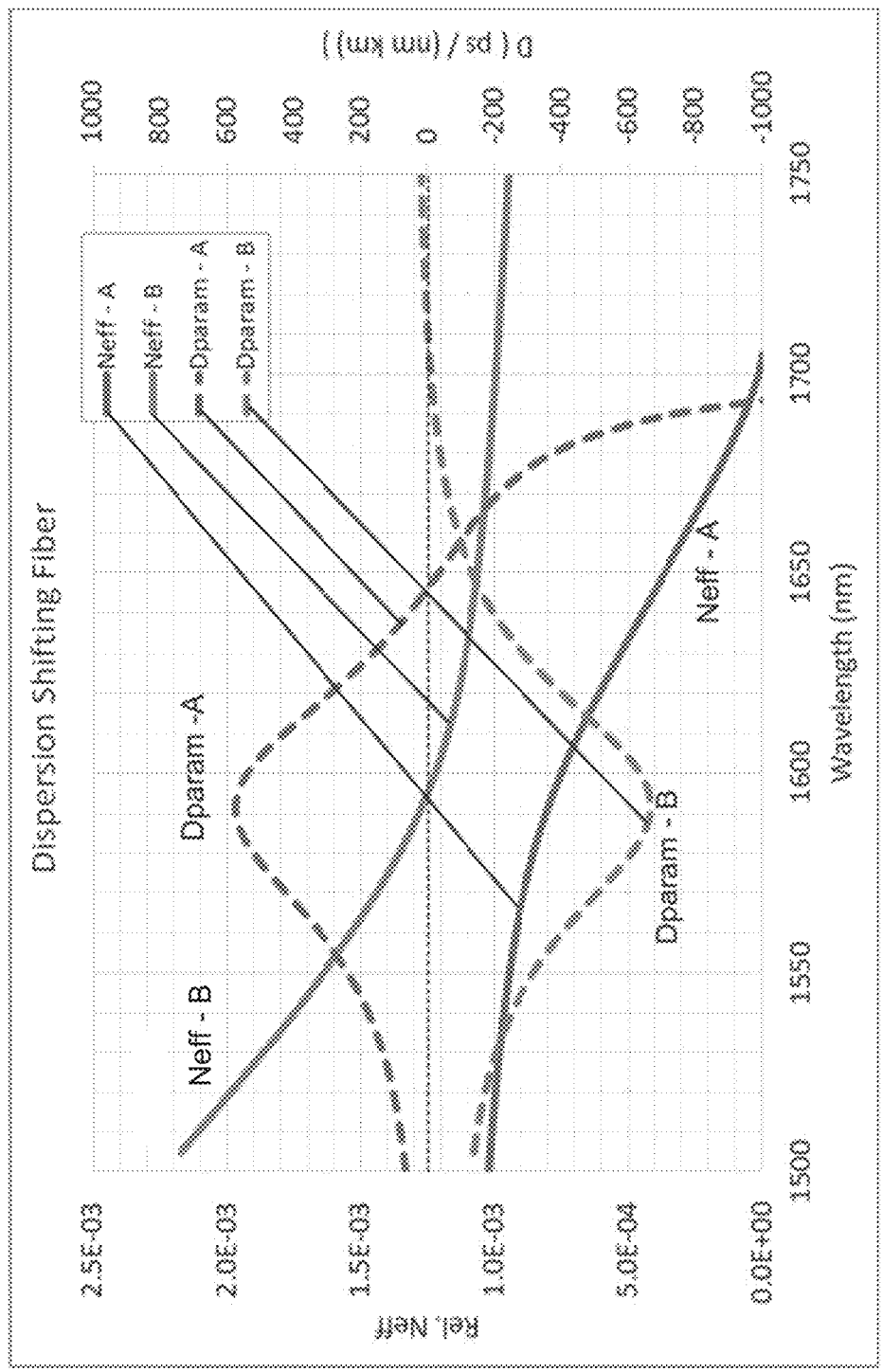
FIG. 3 shows the effective index and Dispersion parameter of the two supermodes shown in FIG. 2.

FIG. 3 shows the effective index and Dispersion Parameter 'D' for the two supermodes (the upper branch is labeled 'B' and the lower branch is labeled 'A' in FIG. 3). In the normal dispersion regime D<0, and D>0 for anomalous dispersion. The upper branch has normal dispersion above about 1600 nm wavelength.

Figure 4:
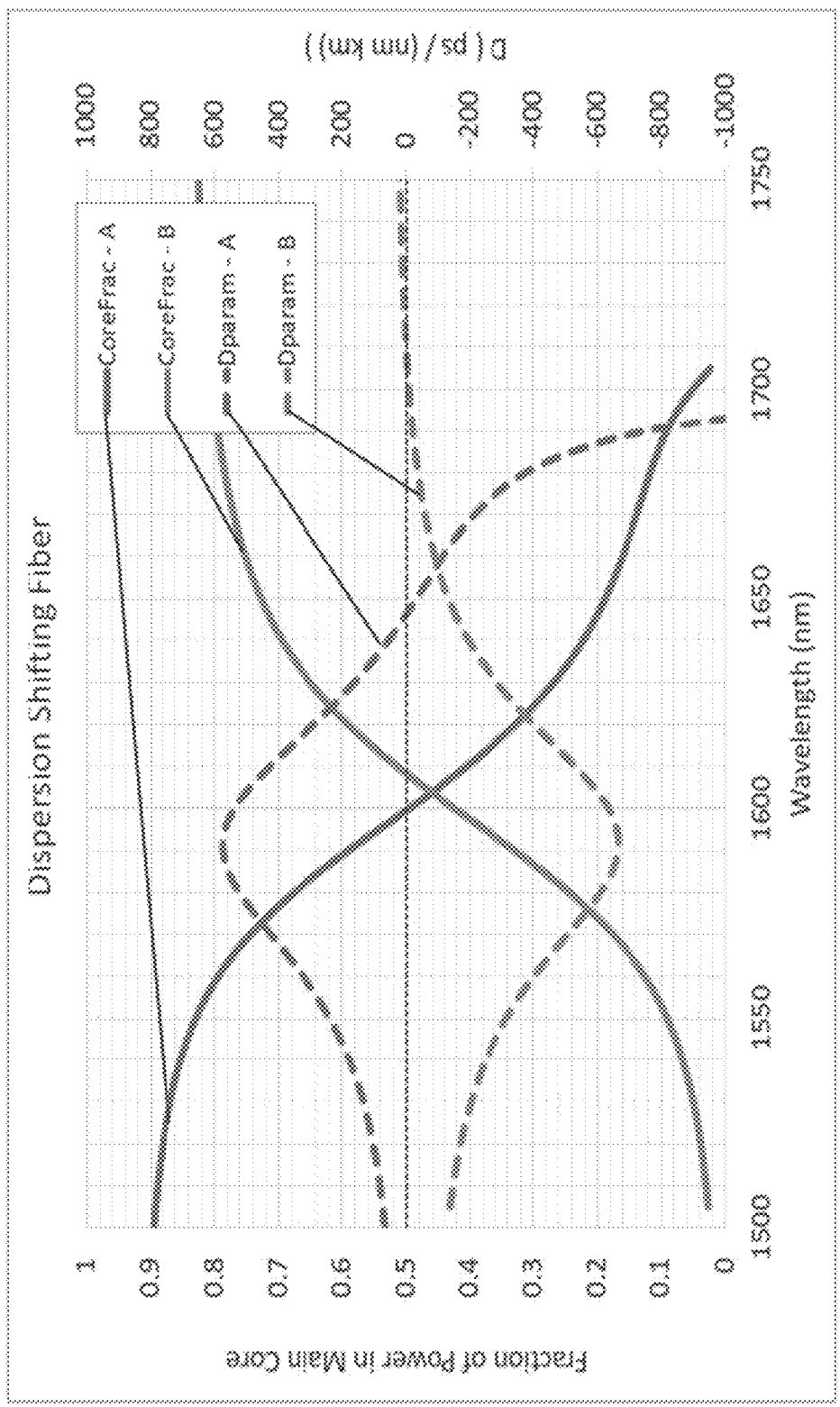
FIG. 4 shows the fractional power in main core, with Dispersion parameter for the two super modes shown in FIGS. 2 and 3.

The new normal dispersion region is useful in the present technology when the corresponding mode resides mostly in the Main Core. FIG. 4 shows the dispersion parameter D and the fraction of power in the Main Core together. Above about 1640 nm, at least 70% of the power is in the Main Core.

The above figures relate to a straight fiber with a simplified structure having a single side core, and are for illustration only. For the fiber actually fabricated and on which an experiment was based, the design was adjusted to include four equally spaced side cores, and to account for the fiber coiling effect on the spectrum and dispersion. For example, four smaller side cores are disposed around a larger main core and disposed or embedded in a cladding which has a lower index than the main and side cores. In general, the main and side cores can have same or different index of refraction and the side cores can have same side, shaper, material and/or index as each other or may be different or some may be same and others may be different. The main core may have lower index contrast or difference in index with respect to the cladding (and consequently lower numerical aperture) while the side core(s) may have higher index contrast or different in index with respect to cladding (and consequently higher numerical aperture). The main core may comprise a single region of material having a lateral dimension (e.g., width or diameter) imbedded in the cladding. Similarly, the side core may comprise a single region of material having a lateral dimension (e.g., width or diameter) imbedded in the cladding. The main core may be larger than the side core, e.g., larger lateral dimension of the cross-section orthogonal to the length of the fiber (such as diameter or width).

Raman Fiber and Fiber Amplifier Fabrication

Figure 5:
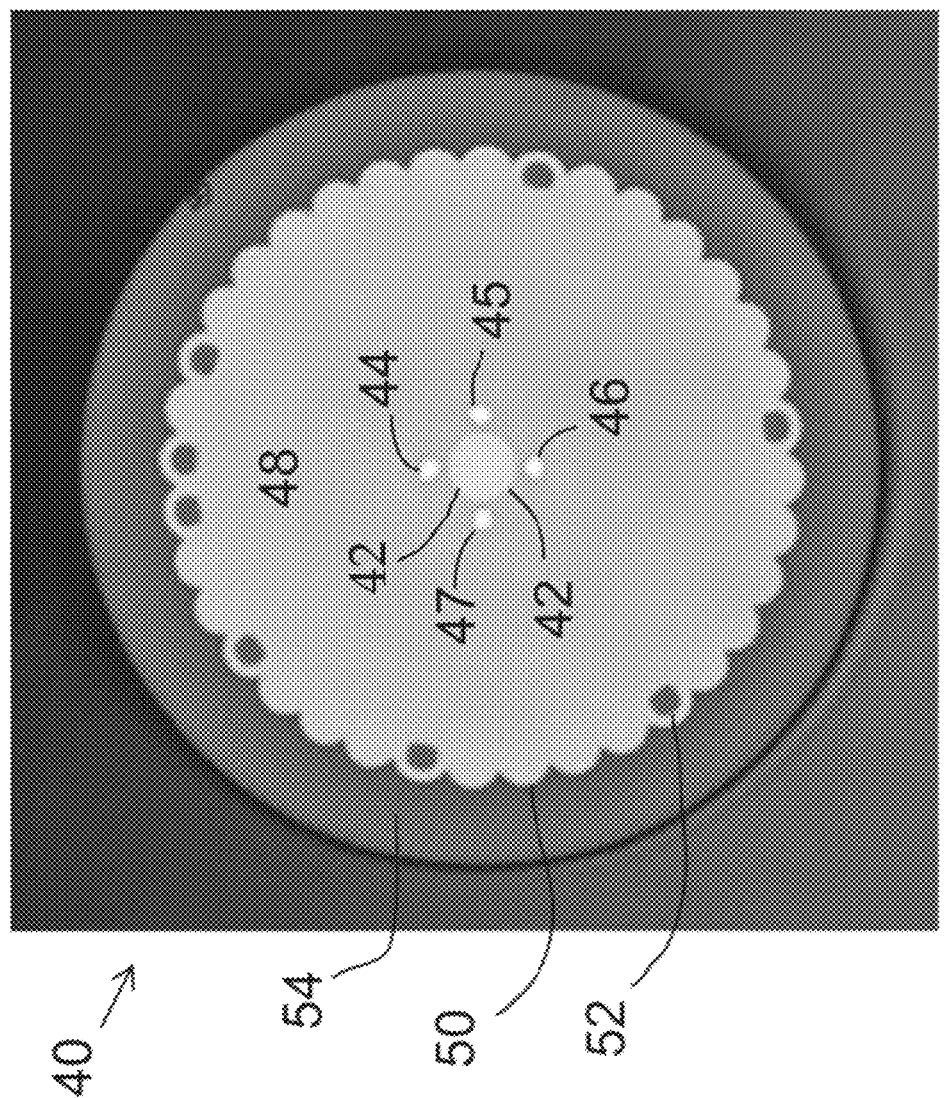
FIG. 5 shows the cross-section of an example fabricated fiber (e.g., Raman fiber) employing the technology described herein and having normal dispersion. The main or center (e.g., step index) core is surrounded by four auxiliary or side cores and disposed or embedded in a cladding.

The present technology has been successfully implemented as a Raman fiber amplifier at the eye safe wavelength of 1640 nm. A normal dispersion fiber was successfully fabricated using stack-and-draw approach. This fiber was designed to operate in the 1530-1650 nm regime. The fiber 40 cross-section is shown in FIG. 5. The main core 42 is 20 μm in diameter, and is made of Ge-doped fused silica and can have an NA of ~0.07 with respect to that of fused silica cladding. This main core 42 is surrounded by four side-cores 44-47 to support the desired supermodes. Each of these side cores is 6.44 μm in diameter and has an edge-to-edge separation of 3 μm from the main core. The side cores 44-47 can be made from standard preforms for multimode GRIN fiber which have peak NA of 0.3. Fused silica cladding 48 surrounds this composite structure. This fiber can be designed for clad-pumping. Its cladding can contain scalloped outer edges 50 or other scatter inducing interface features (e.g., with discontinuities or irregularities) and/or low index scattering elements 52 to improve pump mixing and interaction with the core. An F-doped glass secondary clad layer 54 is used to reduce or minimize the 15xx nm pump absorption that is very problematic with outermost pump clad based on acrylate coatings (not pictured in FIG. 5).

Figure 6:
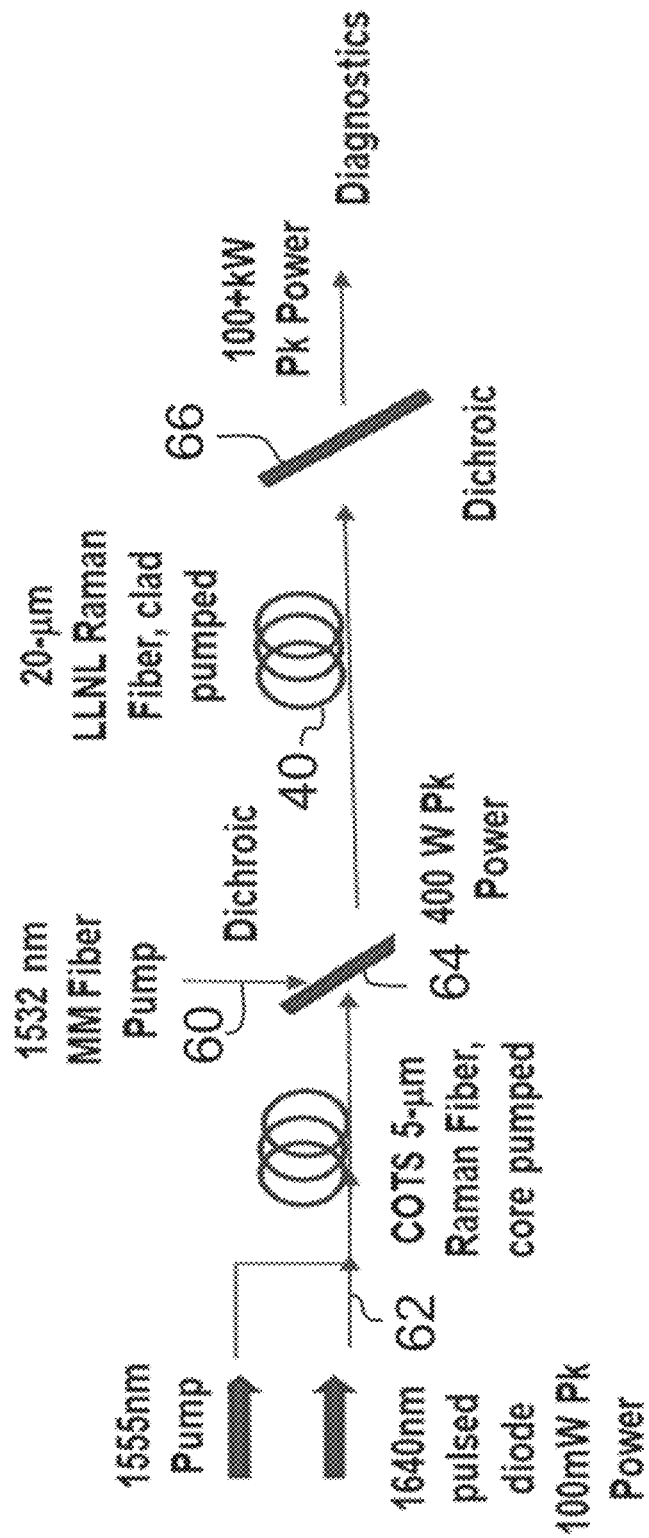
FIG. 6 shows the experimental setup of a Raman Amplifier.
Figure 7A:
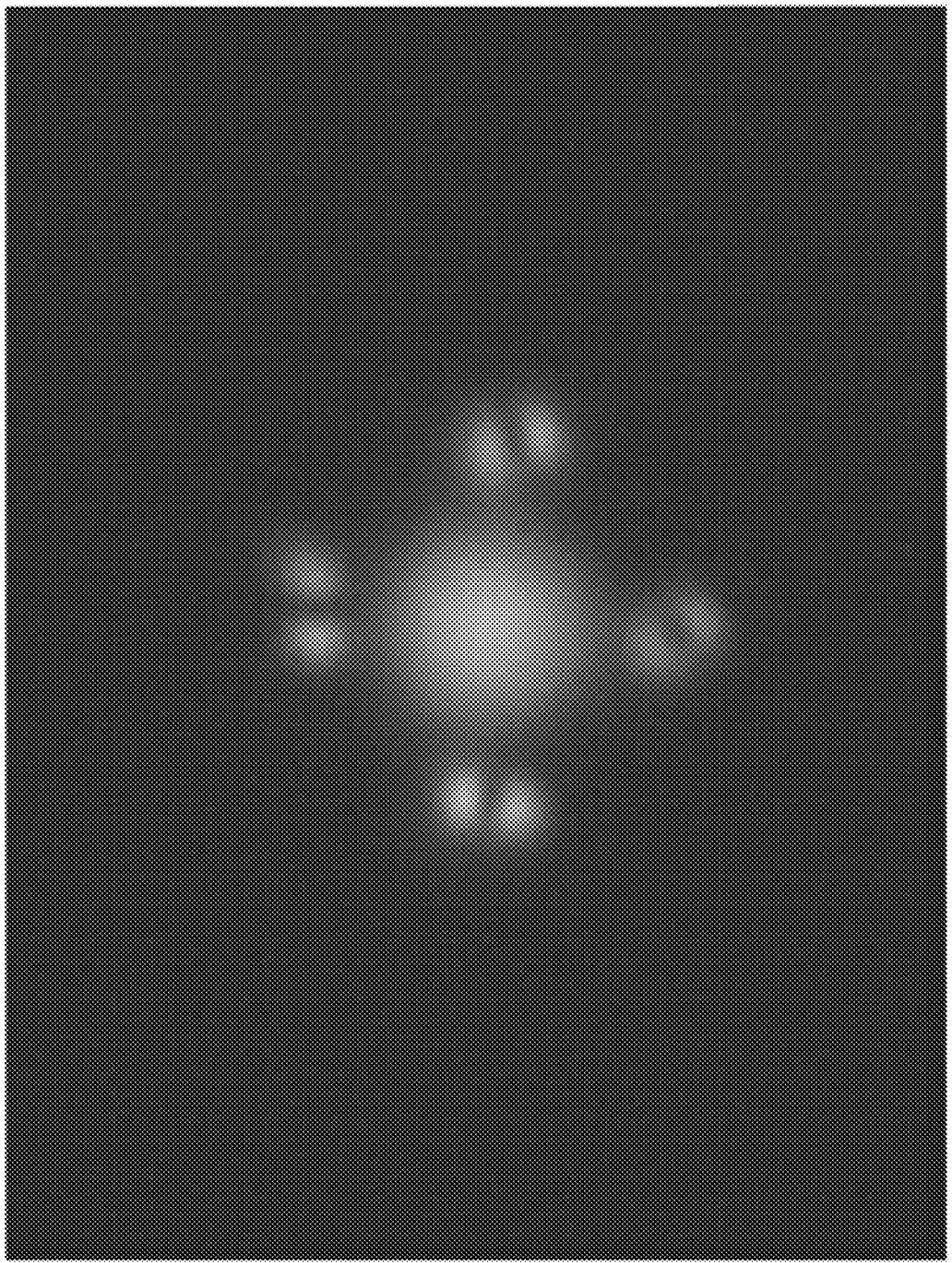
FIG. 7A shows the fiber nearfield output and FIG. 7B shows the optical spectrum of Raman output.
Figure 7B:
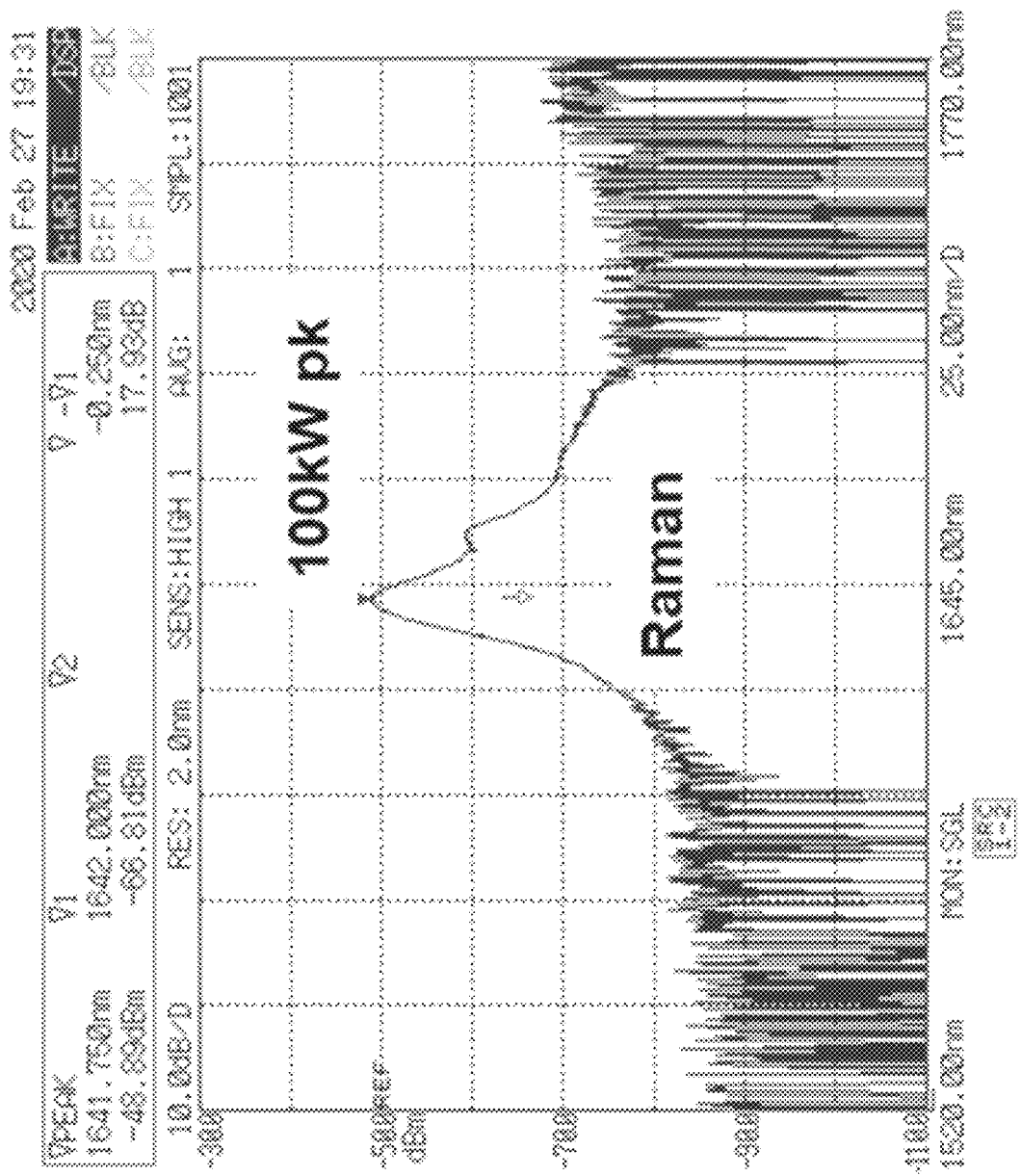

The fiber design of FIG. 5 was employed in the configuration of FIG. 6 to successfully fabricate a cladding-pumped Raman fiber amplifier. A 1532 nm pump laser beam 60 is provided by a pulsed Er fiber amplifier comprising a multimode Erbium (Er) fiber with 100 μm core. The all-fiber pump laser outputs up to 1 mJ pulse energy with nanosecond pulse width and >10 kHz PRF. The 1640 nm pulsed seed laser beam 62 originates from a pulsed diode and is boosted to 400 W peak power in a 2 ns time duration. The 1640 nm seed laser and 1532 nm pulse pump are multiplexed with a dichroic mirror 64 and coupled into the Raman fiber 40 of FIG. 5. A second dichroic 66 at the fiber amplifier output separates the amplified Raman signal from the residual 1532 nm Er pump. This configuration achieved 23 dB gain and >100 KW peak power at fiber amplifier output with 60% of the total power in the fiber's Main Core without observing pulse temporal instability or spectral white light generation, as illustrated by the fiber near field image of FIG. 7A (which illustrates the power fraction in the main core) and the well-defined optical spectrum shown in FIG. 7B without any auxiliary spectral peaks. This result is an output that is at least 100× higher than that from a Raman amplifier using a fiber with comparable core size but with anomalous dispersion.

FIGS. 8-10 show the effect of fiber coiling, for a fiber configured with three (instead of four) side cores. Any suitable number of side cores can be used, as discussed herein. FIG. 8 shows the effective index and Dispersion parameter of the relevant supermodes of a structure with three identical auxiliary or side core dispersion altering elements (e.g., GRINs). In this example, the three side core elements are disposed about the main core. In this example, the three side core elements are equally spaced from each other about the main core. Notably, the distance from adjacent side core elements is larger than the distance from a individual side core and the main core. As illustrated, three supermodes result from the hybridization of three side cores with the main core. The inset (lower left) shows a sketch of the structure, and the inset (right) shows the fields at a preferred operating wavelength. The supermode labeled B includes the most energy in the main core at the wavelength 1600 nm and above, e.g., at 1645 nm or above (e.g., to 1750 nm).

FIG. 9 shows the effect of coiling, in the first of two distinct orientations, on the effective index and Dispersion parameter of the structure of FIG. 8, along with the fields at the preferred operating wavelength. The gap is 3.0 micrometer (μm). The coil diameter is 400 mm and the coil center is in the ~X direction. The three side cores are shown arranged around the main core at 3 o'clock, 7 o'clock, and 11 o'clock positions, whereas the coil is in the 9 o'clock direction. Expressed differently, the side cores are arranged about the core separated by 120°. One is at 90° (+x axis), one at 210°, and one at 330°, while the coiling is in the horizontal plane, with coil center in the 270° direction. Even with the coiling, a substantial portion of the light in the supermode labeled B is in the main core.

FIG. 10 shows the effect of coiling, in the second of two distinct orientations, on the effective index and Dispersion parameter of the structure of FIG. 8, along with the fields at the preferred operating wavelength. The gap is 3.0 micrometer (μm). The coil diameter is 400 mm and the coil center is in the +X direction. The three side cores are shown arranged around the main core at 3 o'clock, 7 o'clock, and 11 o'clock positions, whereas the coil center is in the 9 o'clock direction. Expressed differently, the side cores are arranged about the core separated by 120°. One is at 90° (+x axis), one at 210°, and one at 330°, while the core coiling is in the horizontal plane, with the coil in the 90° direction. Even with the coiling, a substantial portion of the light in the supermode labeled B is in the main core.

In various implementations of the technology described herein, the array of side core elements is sparse, the number of side elements may for example be 10 or less or 8 or less or 6 or less or 5 or less or 4 or less or 3 or less or 2 or 1 or any range between any of these values (e.g., from 6 to 2 side cores). For example, the more side core elements that are included around the main core, the closer the side core elements may be to each other. Such close proximity between side core elements may cause hybridization of the modes of the side core elements with each other. Additionally, more optical energy may be within the side core elements reducing the amount of optical energy in the main core. Accordingly, a reduced or sparse number of side cores may be included in certain implementations. Likewise, the distance between two side core elements may be larger than the distance from one (or both) of the two side core element and the main core. Similarly, the average distance between side core elements may be larger than the average distance from an individual side core element and the main core. In some configurations the distance separating the side core elements is at least 2 times, 3 time, 4 times, 5 times, 6 times, 7 time, 8 times, 9 times, 10 times, 11 time, 12 times, 15 times, 16 times, 18 times, 20 times, 25 time, or any range between any of these values (e.g., from 5 times to 15 times or 4 times to 12 times, etc.) the distance from the main core and the side core (as measured from edge to edge). Similarly, the separation between the main core and the side core may be less than the lateral dimensions (e.g., width or diameter) of the cross-section of the side core orthogonal to the length of the fiber. In some configurations the lateral size (e.g., width, height, or diameter) of the side core element is at least 2 times, 3 time, 4 times, 5 times, 6 times, 7 time, 8 times, 9 times, 10 times, 11 times, 12 times, or any range between any of these values (e.g., from 3 to 5 times) the distance from the main core and the side core (as measured from edge to edge). The size of the side cores however may be small, for example, small in comparison to the main core such that most of the optical energy is in the main core.

In various implementations the number of side cores is small and the distance therebetween relatively large such that most of the optical energy is in the core. If the number of side cores increases and/or the distance between the side cores is too small, the side cores can begin to resemble a ring (when considering the two dimensional cross-section orthogonal to the length of the fiber) which may draw optical energy from the core. In various implementations herein, the side core does not comprise a ring disposed around the main core (in the cross-section orthogonal to the length of the fiber). Similarly, in various implementations the side cores disposed about the main core are not so many that the side cores are closely spaced with respect to each other to form a ring disposed around the main core (in the cross-section orthogonal to the length of the fiber). As discussed above, such rings may draw energy away from the main core. Additionally, the modes of side core elements that are closely space with respect to each other may cause hybridization of the modes of the side cores. Similarly, in various implementations, the fiber does not comprise photonic crystal fiber, photonic bandgap fiber or holey fiber. For example, the fiber does not comprise photonic crystal fiber, photonic bandgap fiber or holey fiber comprising a ring or a plurality of features that forms a ring round a central core.

Although various implementations have been described herein, a wide range of variations are possible. For example, the number of side cores may be 1, 2, 3, 4, 5, 6, 7, 8, 9, 10, 11, 12 or any range between any of the values (e.g., 2-5 side cores), as well as possibly values outside these ranges. Accordingly in some implementations, no more than 12 side cores, no more than 11 side cores, no more than 10 side cores, no more than 9 side cores, no more than 8 side cores, no more than 7 side cores, no more than 6 side cores, no more than 5 side cores, no more than 4 side cores, no more than 3 side cores, no more than 2 side cores, only one side core, or any ranges therebetween (e.g., at least 2 and no more than 5 or at least 3 and no more than 6), can be included in the fiber. The size of the side core(s) may be 1 μm, 2 μm, 3 μm, 4 μm, 5 μm, 6 μm, 7 μm, 8 μm, 9 μm, 10 μm, or any range between any of the values (e.g., 2 microns to 8 microns), as well as possibly values outside these ranges. The numerical aperture of the side core(s) may be 0.1, 0.15, 0.2, 0.25, 0.3, 0.35, 0.4, 0.45, 0.5, 0.55, 0.6 or any range between any of the values (e.g., 0.2 to 0.4), as well as possibly values outside these ranges. The side cores may have circular cross-section orthogonal to the length of the fiber or may have other shapes, e.g. oval, triangle, square, hexagon, etc. The size of the main core may for example be 10 μm, 15 μm, 20 μm, 25 μm, 30 μm, 35 μm, 40 μm, 45 μm, 50 μm, 55 μm, 60 μm, or any range between any of the values (e.g., 20 microns to 50 microns), as well as possibly values outside these ranges. The numerical aperture of the main core(s) may be 0.01, 0.02, 0.03, 0.04, 0.05, 0.06, 0.07, 0.08, 0.09, 0.1, or any range between any of the values (e.g., 0.02 to 0.08), as well as possibly values outside these ranges. The fiber may be configured such that the percentage of light (e.g., of an operating wavelength, such as in the eye-safe regime or at 1600 nm or 164 nm and/or where the fiber has normal dispersion) within the main core may be 50%, 55%, 60%, 65%, 70%, 75%, 80%, 85%, 90%, 95%, 100%, or any range between any of the values (e.g., from 60% to 80% or from 70% to 100%) as well as possibly values outside these ranges (e.g., for different operating wavelengths) as can be specified by a particular application. Higher percentage of power in the main core is typically preferred. The distance of the side cores from the main core (e.g., edge to edge) may for example be on average 1 μm, 2 μm, 3 μm, 4 μm, 5 μm, 6 μm, 7 μm, 8 μm, or any range between any of the values (e.g., 2 microns to 6 microns), as well as possibly values outside these ranges. The operating wavelength of the fiber (e.g., region where fiber is normal dispersion) can be in the eye-safe or eye-safer wavelength regime, which can be above about 1450 nm. Above that wavelength there is absorption of the light in the cornea, which can impede high intensity focusing of the light at the retina, which can be beneficial for various systems where a person's eyes could be exposed to the laser light. The operating wavelength of the fiber and/or region where fiber is normal dispersion) may for example be and/or include 1450 nm, 1500 nm, 1550 nm, 1600 nm, 1610 nm, 1620 nm, 1630 nm, 1640 nm, 1650 nm, 1660 nm, 1670 nm, 1680 nm, 1690 nm, 1700 nm, 1710 nm, 1720 nm, 1730 nm, 1740 nm, 1750 nm, 1760 nm, 1770 nm, 1780 nm, 1790 nm, 1800 nm, 1850 nm, 1900 nm, 1950 nm, 2000 nm, 2050 nm, 2100 nm, 2150 nm, 2200 nm, 2250 nm, 2300 nm, 2350 nm, 2400 nm, 2450 nm, 2500 nm or any range between any of the values (e.g., 1600 nm to 1700 nm), as well as possibly values outside these ranges. In some implementations, the fiber can have normal dispersion across the full range of these wavelength ranges, in some embodiments. In some implementations, the fiber can have normal dispersion at one or more locations or operating ranges within these wavelength ranges. An operating wavelength range and/or region where fiber is normal dispersion may be 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 250 nm wide, or any range between any of the values (e.g., from 90 nm wide to 150 nm wide), as well as possibly values outside these ranges. In some implementations, the fiber can have normal dispersion for a wavelength where 40%, 45%, 50%, 55%, 60%, 65%, 70%, 75%, 80%, 85%, 90%, 95%, 98%, or more of the optical power is in the main core, or any values or ranges between any of these values (e.g., 60% to 90% or 65% to 95% or 70% to 99% or 75% to 100%). Although the side cores are show evenly spaced about the main core, the side cores need not be evenly spaced. The sides cores can cover less than 0.5%, 1%, 2%, 3%, 5%, 7%, 10%, 15%, 20%, 25%, 30%, 35%, 40%, 45%, or 50% of the angular distance surrounding the main core, or any values or ranges therebetween (e.g., 2% to 20%), although other configurations could be used. For example, a plurality of side cores can cover a total of 9 degrees out of the 360 degrees surrounding the main core, which can be an angular distance coverage of 2.5%. Although the side cores have the same shape, size and/or comprise the material or index or index profile, the side cores need not be the same in one or more of these respects. In some implementations, some side cores may be the same or have the same characteristics (e.g., same shape, size and/or comprise the material or index or index profile) while one or more sides cores may be different (e.g., have different shape, size and/or comprise the material or index or index profile.)

As discussed above, the main core and the side core are disposed or embedded in a cladding and have a higher refractive index that the cladding. The main core and side core can have same or different indices of refraction with either higher or lower than the other. The main core may comprise a monolithic structure, a region of contiguous material embedded in the cladding (e.g. formed from a rod that is drawn to form the fiber). The main core may have a circular cross-section orthogonal to the length of the fiber and may have a diameter. The main core, however, need not have a circular cross-section. Similarly, an individual side core may comprise a monolithic structure, a region of contiguous material embedded in the cladding (e.g. formed from a rod that is drawn to form the fiber). The side core may have a circular cross-section orthogonal to the length of the fiber and may have a diameter. The side core, however, need not have a circular cross-section. The main core may or may not comprise a step index. The side core may or may not comprise a graded index. When referring to the index of refraction of a graded or gradient index (GRIN) region such as the graded or gradient index of side core (e.g., a graded or gradient index having a parabolic profile with respect to radial distance from the center of the side core), an index of refraction number characterizing such a region as used herein may correspond to the maximum index or the average index.

As describe herein, the smaller side cores are disposed around a larger main core and disposed or embedded in a cladding which has a lower index than the main and side cores. The main core may have lower index contrast or difference in index with respect to the cladding (and consequently lower numerical aperture) while the side core(s) may have higher index contrast or different in index with respect to cladding (and consequently higher numerical aperture) however in other implementations the side core may have lower index contrast than the main core. The main core may comprise a single monolithic region of the same material having a lateral dimension (e.g., width or diameter as described above) imbedded in the cladding. Similarly, the side core may comprise a single region of the same material having a lateral dimension (e.g., width or diameter as described above) imbedded in the cladding. In various implementations, the main core or the cladding do not comprise one or more holes and the fiber is not holey fiber. In various implementations, the fiber does not comprise photonic crystal fiber, photonic bandgap fiber or hole fiber. The main core may be larger than the side core, e.g., larger lateral dimension of the cross-section orthogonal to the length of the fiber (such as diameter or width).

Figure 11:
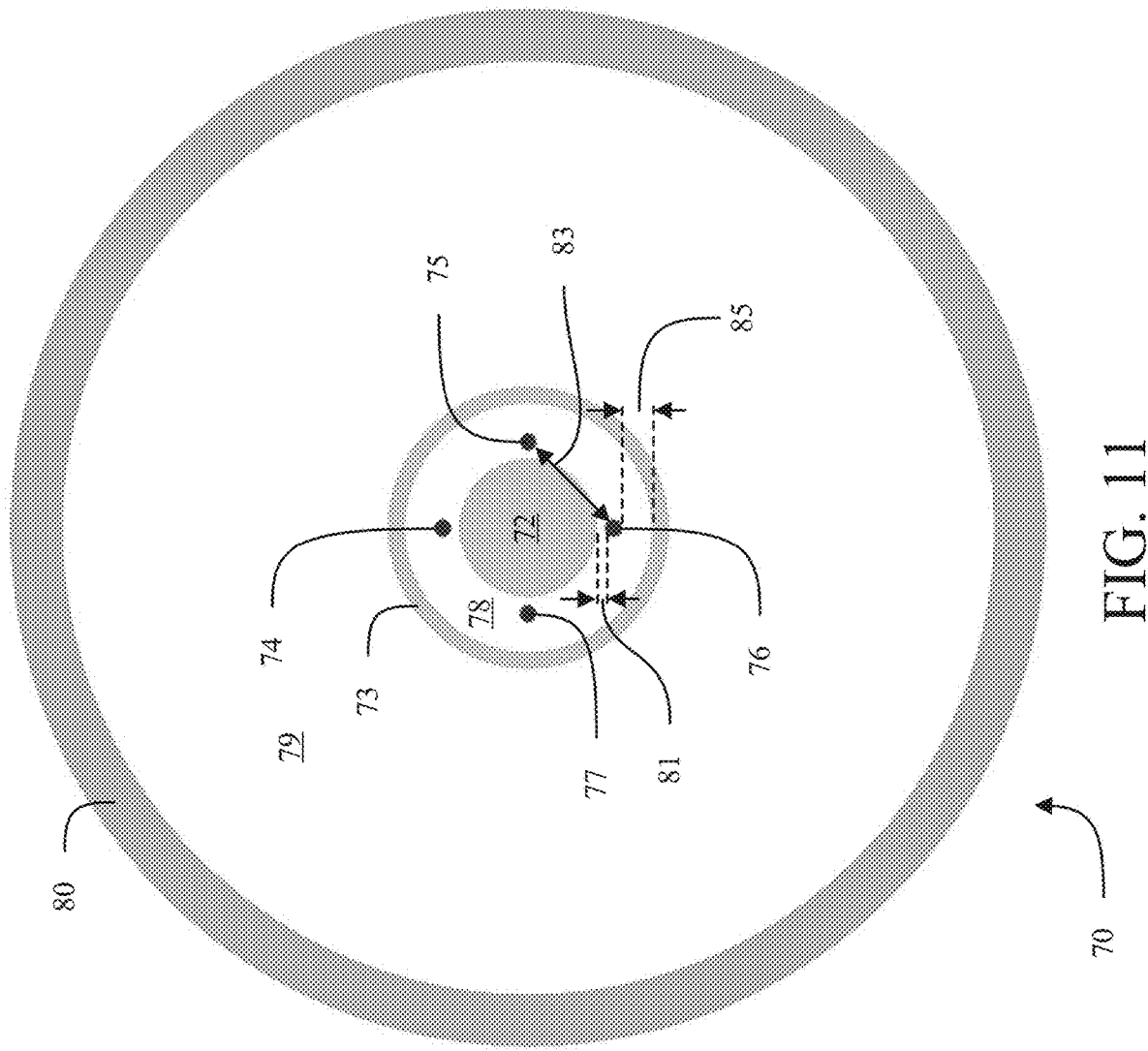
FIG. 11 shows a trench or ring fiber with the dispersion modifying auxiliary or side core elements surrounding a main or central core.

FIG. 11 shows a cross-sectional view of another example design of an optical fiber 70, which can have some features similar to the other optical fibers disclosed herein, such as the fiber 40 shown in FIG. 5. The fiber 70 can be a very large core diameter fiber that includes an outer ring for the suppression of higher order modes, and to which the dispersion modifying technique of the present invention has been applied. The fiber 70 can be a large mode area (LMA) fiber. The fiber 70 can have a main core 72, which can have a diameter of about 50 microns, although other sizes can be used. For example, the main core 72 can have a diameter, width, or lateral dimension of about 20 microns, about 25 microns, about 30 microns, about 35 microns, about 40 microns, about 45 microns, about 50 microns, about 55 microns, about 60 microns, about 65 microns, about 70 microns, about 75 microns, about 80 microns, about 85 microns, about 90 microns, about 95 microns, about 100 microns, or more, or any values or ranges between any combination of these values (e.g., 20 microns to 60 microns or 25 to 75 microns), although other sizes could also be used. The main core 72 can be made of fused silica, which can be doped (e.g., with germanium (Ge), although any suitable doping can be used), such as to raise the index of refraction of the core 72 relative to undoped fused silica.

The main core 72 can be surrounded by and/or embodied in cladding 79. In some designed, the cladding 79 can be made of fused-silica, which can be undoped, although any suitable material or configuration can be used. The cladding 79 can have a lower index of refraction than the main core 72. The fiber 70 can be configured to guide light in at least the main core 72, such as by total internal reflection (TIR).

The fiber 70 can include four side cores 74-77, although any suitable number of side cores can be used (e.g., 1 side core, 2 side cores, 3 side cores, 4 side cores, 5 side cores, 6 side cores, 7 side cores, 8 side cores, 9 side cores, 10 side cores, 11 side cores, 12 side cores, or more, or any ranges therebetween (e.g., 2 to 6 side cores), although other configurations could be used. Accordingly in some implementations, no more than 12 side cores, no more than 11 side cores, no more than 10 side cores, no more than 9 side cores, no more than 8 side cores, no more than 7 side cores, no more than 6 side cores, no more than 5 side cores, no more than 4 side cores, no more than 3 side cores, no more than 2 side cores, only one side core, or any ranges therebetween, which can be included in the fiber. The sides cores can cover less than 0.5%, 1%, 2%, 3%, 5%, 7%, 10%, 15%, 20%, 25%, 30%, 35%, 40%, 45%, or 50% of the angular distance surrounding the main core, or any values or ranges therebetween (e.g., 2% to 20%), although other configurations could be used. For example, a plurality of side cores can cover a total of 9 degrees out of the 360 degrees surrounding the main core, which can be an angular distance coverage of 2.5%. The main core together with the side cores 74-77 in sufficiently closes proximity thereto can support supermodes, and can modify the dispersion of the fiber 70 (e.g., similar to the other side core features disclosed herein). The side cores 74-77 can be disposed in a trench 78 having lower refractive index than the main core 72. (The term trench may be associated with a region of lower refractive index surrounded by regions of higher refractive index in an refractive index profile along a cross-section across the width or diameter of the optical fiber.) The side cores 74-77 can also have a higher index of refraction than the trench 78. The side cores 74-77 can have a higher index of refraction than the main core 72, such as at operating wavelengths although need not be so limited. The side cores 74-77 can have a graded or gradient index (GRIN), as discussed herein. The index of refraction can vary across the cross-sectional diameter or radius of the side core 74-77. The trench material 78 can surround the side cores 74-77.

The side cores 74-77 can be substantially evenly distributed in the around the main core 72. For example, with four side cores 74-77, the side cores 74-77 can be positioned at about 90 degree intervals. A fiber with three side cores can have the side cores distributed at about 120 degree intervals. A fiber with n side cores can have the side cores distributed at about 360/n degree intervals. However, other arrangements are possible. The side cores 74-77 can be closer to the main core 72 than to neighboring side cores 74-77, which can enable mode hybridization between the main core 72 and the one or more side cores 74-77, while impeding mode hybridization between the side cores 74-77. The edge-to-edge distance 81 between the main core 72 and one of the side cores 74-77 (e.g., side core 76) can be less than the edge-to-edge distance 83 between the one of the side cores 74-77 and a neighboring one of the side cores 74-77 (e.g., between side core 76 and side core 75). For example, the distance 83 can about 3 times, about 5 times, about 7 times, about 10 times, about 12 times, about 15 times, or about 20 times the distance 81, or more, or any values or ranges therebetween (e.g., 3 times to 15 times), although other configurations can also be used. As discussed herein, the distance 83 between the side cores can be large enough that the modes of the side cores do not hybridize. In various implementations, the optical fiber can be configured to have only the LP01 and LP11 modes. In some implementations, the distance 81 can be less than a diameter of the side core 74-77. For example, the distance 81 can be about 25%, about 30%, about 35%, about 40%, about 45%, about 50%, about 55%, about 60%, about 65%, about 70%, about 75%, about 100%, about 150%, about 200%, about 300% of the diameter of the side core 74-77, or any values or ranges therebetween (e.g., 50% to 100%), although other configurations outside these ranges are also possible. The side cores 74-77 can have a diameter, width, or lateral dimension of about 2 microns, about 3 microns, about 4 microns, about 5 microns, about 6 microns, about 7 microns, about 8 microns, about 9 microns, about 10 microns, about 11 microns, about 12 microns, or any values or ranges between therebetween (e.g., 4 microns to 10 microns), although other sizes could also be used. The edge-to-edge separation distance 81 between the main core 72 and the respective side core 74-77 can be about 1 micron, about 1.5 microns, about 2 microns, about 2.5 microns, about 3 microns, about 3.5 microns, about 4 microns, about 4.5 microns, about 5 microns, about 5.5 microns, about 6.5 microns, about 7 microns, about 7.5 microns, about 8 microns, about 9 microns, about 10 microns, or any values or ranges therebetween (e.g., 4 microns to 10 microns), although other distances could be used in some implementations. The edge-to-edge separation distance 83 between neighboring side cores 74-77 can be about 10 microns, about 15 microns, about 20 microns, about 25 microns, about 30 microns, about 35 microns, about 40 microns, about 45 microns, about 50 microns, about 55 microns, about 60 microns, about 65 microns, about 70 microns, about 75 microns, or more, or any values or ranges between any of these values (e.g., 20 microns to 60 microns), although other configurations could also be used.

In some embodiments, a fiber 70 including the main core 72 surrounded by the side cores 74-77 can be configured to propagate energy at a fundamental mode and also at higher order modes (HOM). The fiber 70 of FIG. 11 can have a larger diameter main core than the fiber 40 of FIG. 5, and in some case a larger diameter core can result in more energy in the higher order modes. Accordingly, in some embodiments, the fiber 70 can include features for HOM suppression. In addition to dispersion modifying elements (e.g., side cores 74-77), the fiber 70 may include elements whose function is to discriminate against the HOMs in terms of confinement loss, mode effective area, effective index difference, and/or other characteristics. In some embodiments, the optical fiber 70 can be a trench fiber or ring fiber, which can have a step index core (e.g., the main core 72) surrounded by a ring 73 having an index of refraction substantially equal to the main core, separated by a trench (which can include a lower index material, such as cladding). In some implementations, however, the main core and the ring need not have the same refractive index but one can be higher and the other lower. The term ring is used as the when viewed from a cross-section orthogonal to the length of the fiber, this region of high index material (e.g., compared to the trench) is in the shape of a ring about the main core 72, side cores 74-77, and trench 78. The ring 73, containing more high index material away from the main core, can serve to delocalize the HOM from the main core 72 and make it more lossy. The trench design can have the advantage of accommodating the dispersion modifying elements, while also suppressing HOMs. The dispersion modifying elements (e.g., one or more side cores) can have the advantage of being compatible with the ring or trench fiber design. The trench or ring fiber 70 can have a large core size with a diameter of about 50 microns, for operation around 1600 nm, although various other configurations are possible. By itself, the main core 72 can support multiple higher order modes (HOM) in addition to the fundamental mode, with undesirable anomalous dispersion. However, with the dispersion modifying elements (e.g., the side cores 74-77) and the HOM suppressing element (e.g., the outer ring 73), the HOMs can be suppressed and the fundamental mode can have desirable normal dispersion.

The fiber 70 can include a cladding 79, which can surround, or be positioned radially outward from, the ring 73. The ring 73 can separate the trench 78 from the cladding 79. The trench 78 and the cladding 79 can have substantially the same index of refraction, and can both contain fused silica (e.g., undoped), although other materials and configurations can be used. The ring 73 can have a higher index of refraction than the trench 78. The ring 73 can have a higher index of refraction than the cladding 79. The ring 73 can have substantially the same index of refraction as the main core 72. In other configurations, the index of refraction of the ring 73 can be higher or lower than the index of refraction of the main core 72. The ring 73 can have an index of refraction that is lower than the index of the side cores 74-77, although the ring 73 could be configured to have an index substantially equal to or higher than the index of the side cores 74-77. Generally though, the trench 78 and cladding 79 will have lower refractive index than the main core 72, side core 74-77, and ring 73. The ring can be doped fused silica (e.g., Ge-doped fused silica), but any suitable materials could be used. The ring 73 can be fully annular (e.g., in the cross-section orthogonal to the length of the fiber), such as extending a full 360 degrees.

In some implementations, the ring 73 can have a thickness that is smaller than a thickness of the trench portion 78. Similarly, in some implementations, the thickness of the ring 73 can be smaller than the diameter or radius of the main core 72. The thickness of the ring can be smaller than, larger than, or about the same as the diameter of the one or more side cores 74-77. The thickness of the ring can, in some cases, be about 2.5 microns, about 3 microns, about 4 microns, about 5 microns, about 6 microns, about 7 microns, about 8 microns, about 9 microns, about 10 microns, about 11 microns, about 12 microns, or any values or ranges between therebetween (e.g., 4 microns to 10 microns), although other sizes could also be used. The one or more side cores 74-77 can be closer to the main core 72 than to the ring 73. A distance 85 from an outer edge of the side core 74-77 to an inside edge of the ring 73 can be more than the distance 81. The distance 85 can be more than the diameter of the side core 74-77. The distance 85 can be about 5 microns, about 6 microns, about 7 microns, about 8 microns, about 9 microns, about 10 microns, about 11 microns, about 12 microns, about 13 microns, about 14 microns, about 15 microns, about 16 microns, about 17 microns, about 18 microns, about 19 microns, about 20 microns, or any values or ranges between therebetween (e.g., 6 microns to 15 microns), although other sizes could also be used. In some embodiments, the ring 73 and trench 78 can be omitted. For example, the cladding 79 can extend to the main core 72 and to the side core(s) 74-77, such as in the fiber 40 of FIG. 5.

The optical fiber 70 can be configured for clad-pumping, in some cases. The fiber 70 can have a secondary cladding 80, which can be similar to the secondary cladding layer 54 of the fiber 40 in FIG. 5. In some implementations, the outside edge of the cladding 79 and/or the interface between the cladding 79 and the secondary cladding 80 is textured to provide increased mixing of light such as pump light propagating in the region surrounded by the secondary cladding. For instance, the outside edge of the cladding 79 and/or the interface between the cladding 79 and the secondary cladding 80 can be scalloped, as shown for example in FIG. 5, or can have other scatter inducing surface features (e.g., with discontinuities or irregularities). The fiber 70 can include scattering elements, which can be similar to the scattering elements 52 of FIG. 5. The scattering elements can have a lower or higher, or otherwise different, index than the cladding 79. The scattering elements can be embedded in the cladding 79, such as close to the outer periphery of the cladding 79, and can improve pump mixing. The secondary cladding 80 can be doped glass, such as doped silica (e.g., fluorine-doped glass). In some embodiments, the secondary cladding 80 can have a lower index of refraction than the cladding 79, although any suitable configuration can be used. In some embodiments, the secondary cladding 80, scalloped interface, surface scattering features, and/or embedded scattering elements can be omitted.

As described above, various implementations may or may not include a ring 73 such as shown in FIG. 11. In some implementations, the main core and the one or more side cores can be made of the same material or different materials, such as silica with different doping. The main core and one or more side cores can have the same or different indices of refraction. In some embodiments, the one or more side cores can have a higher index of refraction than the main core. In some implementations, the side cores can all have the same configuration, except for their spatial positions. In other implementations, one or more of the side cores can have a different configuration than one or more of the other side cores, such as having different materials, shapes, diameters/thicknesses, indices, distances from main core, distances from neighboring side cores, etc. The main core and the side core(s) can have circular cross-sectional shapes, or any other suitable cross-sectional shape, such as an oval, rectangle, triangle, hexagon, etc. In some embodiments, the at least one side core is not a ring. Although various dimensions are discussed as being diameters, they could also be widths or other lateral dimensions. In some embodiments, the main core and/or the one or more side cores are not or do not comprise holes or are not formed by holes. For example, the main core and the one or more side cores can be made of a material. Similarly, in some embodiments, the fiber is not a holey fiber. In some embodiments, the fiber is not a photonic-crystal fiber or a photonic bandgap fiber. The main core can be a monolithic structure. The one or more side cores can be a monolithic structure.

First Set of Select Examples

1. An optical fiber, comprising:
a cladding;
a main core;
at least one side core having an index of refraction that is higher and a diameter that is smaller than that of said main core such that the modes of said at least one side core have an effective refractive index that varies faster with wavelength than the effective refractive index of modes of said main core, wherein said main core and said at least one side core are embedded within said cladding, wherein said at least one side core is located a distance from said main core such that the modes of said at least one side core and the modes of said main core hybridize into two supermodes having different dispersion than said modes of said main core and said modes of said at least one the side core; and
a secondary cladding surrounding said cladding.

2. The optical fiber of example 1, wherein said optical fiber is characterized as comprising a large mode area (LMA) fiber.

3. The optical fiber of example 2, wherein said LMA fiber comprises normal dispersion around 1530-1650 nm for one of the supermodes.

4. The optical fiber of any one of examples 2 to 3, wherein said LMA fiber is configured for high power Raman amplification at known eye safer wavelengths.

5. The optical fiber of any one of examples 2 to 4, wherein said LMA fiber is useful for high power Raman fiber amplification in spectral regions (including eye safer wavelengths) where other fibers would have anomalous dispersion.

6. The optical fiber of any one of examples 2 to 5, wherein said LMA fiber is a laser source configured for an application selected from the group consisting of telecommunication, additive manufacturing, remote sensing and power beaming.

7. The optical fiber of any one of examples 2 to 6, wherein said LMA fiber comprises a mode diameter of >20 microns.

8. The optical fiber of any one of examples 2 to 7, wherein said LMA fiber is configured with a laser gain media selected from the group consisting of Er, Tm and Nd.

9. The optical fiber of any one of examples 1 to 8, wherein said fiber comprises normal dispersion over at least a 100 nm wavelength range for one of the supermodes.

10. The optical fiber of any one of examples 1 to 9, wherein said cladding includes scattering elements to enhance pump absorption in cladding pumped fiber amplifiers.

11. The optical fiber of any one of examples 1 to 10, wherein said main core is made from Ge-doped fused silica, wherein said at least one side core is made from standard preforms for multimode GRIN fiber.

12. The optical fiber of any one of examples 1 to 11, wherein said cladding contains scalloped outer edges.

13. The optical fiber of any one of examples 1 to 12, wherein said secondary cladding has been F-doped.

14 The optical fiber of any one of examples 1 to 13, wherein when said main core and said at least one side core are placed in proximity, their modes hybridize around the wavelength at which their effective indices coincide, yielding supermodes with qualitatively different dispersion compared to the modes of said main core and said at least one side core isolated one from another.

15. The optical fiber of example 14, wherein the effect wherein their modes hybridize is most pronounced if the wavelength dependence of the effective indices of the modes of the isolated main core and said at least one side core are dissimilar.

16. The optical fiber of example 15, wherein if said main core comprises a mode having a weak (shallow) wavelength dependence and said at least one side core comprises a mode having a strong (steep) wavelength dependence, one of the two supermodes develops an enhanced anomalous dispersion feature, making it undesirable and wherein the other of the two supermodes develops an enhanced normal dispersion feature, which is desirable for suppressing Modulation Instability at eye-safe wavelengths in a silica fiber.

17. The optical fiber of any one of examples 15 to 16, wherein the two supermodes have different levels of overlap with said main core at different wavelengths, with the result that the operating wavelength is to the longer wavelength side of the enhanced normal dispersion feature.

18. The optical fiber of any one of examples 1 to 17, wherein the resulting dispersion of said supermodes is optimized.

19. The optical fiber of example 18, wherein said dispersion is optimized by adjusting the following parameters: (1) regarding the index and size of said two components, defining their modes' effective indices, their wavelength dependence, and the wavelength at which they are coincident, wherein (a) a main core of large size and low index has a shallow wavelength dependence, making it relatively insensitive to variations in size or index, (b) a side core of small size and high index has a steep wavelength dependence, increasing the effect on dispersion and making it relatively sensitive to variations in size or index, which are desirable features.

20. The optical fiber of example 19, wherein regarding the separation of the two components, affecting the magnitude and width of the supermodes' enhanced dispersion features (a) a small separation yields wide and small magnitude features and (b) a large separation yields narrow and large magnitude features.

21. The optical fiber of any one of examples 1 to 20, comprising a ring that surrounds the main core and the at least one side core, the ring having an index of refraction greater than an index of refraction of the cladding, the ring configured to suppress propagation of higher order modes in the main core.

22. The optical fiber of any one of the examples above, comprising at least three and no more than four side cores distributed around the main core.

23. The optical fiber of any one of the examples above, wherein the at least one side core is not a ring.

24. The optical fiber of any one of the examples above, wherein the fiber is configured to have only LP01 and LP11 modes.

25. The optical fiber of any one of the examples above, comprising a plurality of side cores that are spaced apart so that modes of the plurality of side cores do not hybridize with each other.

26. The optical fiber of any one of the examples above, wherein the fiber is configured to provide normal dispersion at a wavelength where at least 60% of the optical power is in the main core.

27. The optical fiber of any one of the examples above, comprising a plurality of side cores that cover less than 20% of the angular distance surrounding the main core.

28. The optical fiber of any one of the examples above, wherein the optical fiber is not a photonic crystal fiber.

29. The optical fiber of any one of the examples above, wherein the optical fiber is not a holey fiber.

30. The optical fiber of any one of the examples above, wherein the main core comprises a monolithic region of the same material.

31. The optical fiber of any one of the examples above, wherein the main core comprises a monolithic region of the same material having a width of at least 20 microns.

32. The optical fiber of any one of the examples above, wherein the main core comprises a monolithic contiguous region of the same material having a width of at least 20 microns providing a step index.

33. The optical fiber of any one of the examples above, wherein the main core does not include holes.

34. The optical fiber of any one of the examples above, wherein the each of the at least one side cores comprises a monolithic region of the material.

35. The optical fiber of any one of the examples above, wherein the each of the at least one side cores comprises a monolithic contiguous region of the material providing a gradient index.

36. The optical fiber of any one of the examples above, wherein the side core does not comprise holes.

37. The optical fiber of any one of the examples above, comprising at least two and no more than five side cores distributed around the main core.

38. The optical fiber of any one of the examples above, comprising at least two and no more than six side cores distributed around the main core.

Second Set of Select Examples

1. An optical fiber comprising:
a main core having an index of refraction;
a trench surrounding the main core and having an index of refraction lower than the index of refraction of the main core;
a ring surrounding the trench and having an index of refraction higher than the index of refraction of the trench;

at least one side core disposed in the trench and having an index of refraction higher than the index of refraction of the trench; and a cladding surrounding the ring and having an index of refraction lower than the index of refraction of the ring.

2. The optical fiber of example 1, wherein the at least one side core is located a distance from said main core such that a mode of said at least one side core and a mode of said main core hybridize into two supermodes having different dispersion than the mode of said main core and the mode of the at least one the side core.

3. The optical fiber of any one of examples 1 to 2, wherein a mode of the at least one side core has an effective refractive index that varies faster with wavelength than an effective refractive index of a mode of the main core.

4. The optical fiber of any one of examples 1 to 3, wherein the ring is configured to suppress the propagation of one or more higher order modes in the main core.

5. The optical fiber of any one of examples 1 to 4, wherein the main core has a width of at least 20 microns.

6. The optical fiber of any one of examples 1 to 4, wherein the main core has a width of 30 microns to 100 microns.

7. The optical fiber of any one of examples 1 to 6, wherein the optical fiber is a large-mode-area (LMA) fiber.

8. The optical fiber of any one of examples 1 to 7, wherein the fiber is configured to provide normal dispersion across a range of wavelengths from 1530 nm to 1650 nm.

9. The optical fiber of any one of examples 1 to 8, wherein the fiber is configured to provide normal dispersion at a wavelength where at least 60% of the optical power is in the main core.

10. The optical fiber of any one of examples 1 to 9, wherein the at least one side core is closer to the main core than to the ring.

11. The optical fiber of any one of examples 1 to 10, wherein the at least one side core includes a plurality of side cores distributed around the main core.

12. The optical fiber of examples 1 to 11, wherein the plurality of side cores are evenly distributed around the main core.

13. The optical fiber of any one of examples 1 to 12, wherein each of the plurality of side cores are closer to the main core than to neighboring side cores.

14. The optical fiber of any one of examples 1 to 13, further comprising a secondary cladding surrounding the cladding.

15. The optical fiber of claim 14, wherein an interface between the cladding and the secondary cladding includes surface scattering features.

16. The optical fiber of any one of examples 1 to 15, wherein the at least one side core has a graded index (GRIN).

17. The optical fiber of any one of examples 1 to 16, comprising a laser gain medium.

18. The optical fiber of any one of examples 1 to 17, at least two and no more than five side cores distributed around the main core.

19. The optical fiber of any one of examples 1 to 18, wherein the at least one side core is not a ring.

20. The optical fiber of any one of examples 1 to 19, wherein the fiber is configured to have only LP01 and LP11 modes.

21. The optical fiber of any one of examples 1 to 20, comprising a plurality of side cores that are spaced apart so that modes of the plurality of side cores do not hybridize with each other.

22. The optical fiber of any one of examples 1 to 21, wherein the fiber is configured to provide normal dispersion at a wavelength where at least 66% of the optical power is in the main core.

23. The optical fiber of any one of examples 1 to 22, comprising a plurality of side cores that cover less than 20% of the angular distance surrounding the main core.

24. The optical fiber of any one of examples 1 to 23, wherein the optical fiber is not a photonic crystal fiber.

25. The optical fiber of any one of examples 1 to 24, wherein the optical fiber is not a holey fiber.

26. The optical fiber of any one of the examples above, wherein the main core comprises a monolithic region of the same material.

27. The optical fiber of any one of the examples above, wherein the main core comprises a monolithic region of the same material having a width of at least 20 microns.

28. The optical fiber of any one of the examples above, wherein the main core comprises a monolithic contiguous region of the same material having a width of at least 20 microns providing a step index.

29. The optical fiber of any one of the examples above, wherein the main core does not include holes.

30. The optical fiber of any one of the examples above, wherein the each of the at least one side cores comprises a monolithic region of the material.

31. The optical fiber of any one of the examples above, wherein the each of the at least one side cores comprises a monolithic contiguous region of the material providing a gradient index.

32. The optical fiber of any one of the examples above, wherein the side core does not comprise holes.

33. The optical fiber of any one of the examples above, wherein the fiber is configured to provide normal dispersion at a wavelength of 1600 nm.

34. The optical fiber of any one of the examples above, wherein the fiber is configured to provide normal dispersion at a wavelength of 1640 nm.

35. The optical fiber of any one of the examples above, wherein the fiber is configured to provide normal dispersion across a wavelength band of at least 90 nm at a wavelength above 1450 nm.

36. The optical fiber of any one of the examples above, wherein the fiber is configured to provide normal dispersion across a wavelength band of at least 90 nm at a wavelength above 1500 nm.

37. The optical fiber of any one of the examples above, wherein the fiber is configured to provide normal dispersion across a wavelength band of at least 90 nm at a wavelength above 1540 nm.

38. A Raman fiber amplifier comprising the optical fiber of any one of examples 1 to 35.

39. The Raman fiber amplifier of example 38, configured to amplify light having a wavelength between 1450 nm and 2500 nm.

40. A fiber laser source comprising the optical fiber of any one of examples 1 to 37.

Third Set of Select Examples

1. An optical fiber comprising:
a main core having an index of refraction;
a cladding outside the main core and having an index of refraction lower than the index of refraction of the main core; and
at least one side core having an index of refraction higher than the index of refraction of the cladding, the at least one side core positioned outside the main core and positioned relative to the main core such that the fiber has normal dispersion for one or more wavelengths above 1450 nm.

2. The optical fiber of example 1, wherein the at least one side core is positioned relative to the main core such that a mode of the main core and a mode of the side core hybridize to produce a first supermode and a second supermode, wherein the first supermode and the second supermode have different dispersion than the mode of the main core in isolation and the mode of the at least one side core in isolation.

3. The optical fiber of example 2, wherein the first supermode has an enhanced normal dispersion feature relative to the mode of the main core in isolation and wherein the second supermode has an enhanced anomalous dispersion feature relative to the mode of the main core in isolation.

4. The optical fiber of any one of examples 1 to 3, wherein an effective refractive index of a mode of the main core in isolation varies with wavelength by a first amount, and wherein an effective refractive index of a mode of the at least one side core in isolation varies with wavelength by a second amount that is more than the first amount.

6. The optical fiber of any one of examples 1 to 4, wherein the main core has a diameter of at least 20 microns.

6. The optical fiber of any one of examples 1 to 5, wherein the optical fiber is a large-mode-area (LMA) fiber.

7. The optical fiber of any one of examples 1 to 6, wherein the fiber is configured to provide normal dispersion across a range of wavelengths from 1530 nm to 1650 nm.

8. The optical fiber of any one of examples 1 to 7, wherein the at least one side core includes a plurality of side cores distributed around the main core.

9. The optical fiber of example 8, wherein the plurality of side cores are evenly distributed around the main core.

10. The optical fiber of any one of examples 8 to 9, wherein each of the plurality of side cores are closer to the main core than to a neighboring side core.

11. The optical fiber of any one of examples 1 to 10, further comprising a secondary cladding surrounding the cladding.

12. The optical fiber of example 11, wherein an interface between the cladding and the secondary cladding has a surface texture configured to increase mixing.

13. The optical fiber of any one of examples 1 to 12, wherein the at least one side core has a graded index (GRIN).

14. The optical fiber of any one of examples 1 to 13, further comprising:
a ring between the cladding and the main core, the ring having an index of refraction higher than the index of refraction of the cladding; and
a trench between the ring and the main core, wherein the trench has an index of refraction that is lower than the index of refraction of the ring.

15. The optical fiber of example 14, wherein the at least one side core is disposed in the trench.

16. The optical fiber of any one of examples 14 to 15, wherein the ring is configured to suppress propagation of one or more higher order modes in the main core.

17. The optical fiber of any one of examples 14 to 16, wherein the at least one side core is closer to the main core than to the ring.

18. The optical fiber of any one of examples 1 to 17, comprising a laser gain medium.

19. The optical fiber of any one of examples 1 to 18, wherein the at least one side core is not a ring.

20. The optical fiber of any one of examples 1 to 19, wherein the fiber is configured to have only LP01 and LP11 modes.

21. The optical fiber of any one of examples 1 to 20, comprising a plurality of side cores that are spaced apart so that modes of the plurality of side cores do not hybridize with each other.

22. The optical fiber of any one of examples 1 to 21, wherein the fiber is configured to provide normal dispersion at a wavelength where at least 60% of the optical power is in the main core.

23. The optical fiber of any one of examples 1 to 22, comprising a plurality of side cores that cover less than 20% of the angular distance surrounding the main core.

24. The optical fiber of any one of examples 1 to 23, at least two and no more than five side cores distributed around the main core.

25. The optical fiber of any one of examples 1 to 24, wherein the optical fiber is not a photonic crystal fiber.

26. The optical fiber of any one of examples 1 to 25, wherein the optical fiber is not a holey fiber.

27. The optical fiber of any one of the examples above, wherein the main core comprises a monolithic region of the same material.

28. The optical fiber of any one of the examples above, wherein the main core comprises a monolithic region of the same material having a width of at least 20 microns.

29. The optical fiber of any one of the examples above, wherein the main core comprises a monolithic contiguous region of the same material having a width of at least 20 microns providing a step index.

30. The optical fiber of any one of the examples above, wherein the main core does not include holes.

31. The optical fiber of any one of the examples above, wherein the each of the at least one side cores comprises a monolithic region of the material.

32. The optical fiber of any one of the examples above, wherein the each of the at least one side cores comprises a monolithic contiguous region of the material providing a gradient index.

33. The optical fiber of any one of the examples above, wherein the side core does not comprise holes.

33. The optical fiber of any one of the examples above, wherein the fiber is configured to provide normal dispersion at a wavelength of 1600 nm.

34. The optical fiber of any one of the examples above, wherein the fiber is configured to provide normal dispersion at a wavelength of 1640 nm.

35. The optical fiber of any one of the examples above, wherein the fiber is configured to provide normal dispersion across a wavelength band of at least 90 nm at a wavelength above 1450 nm.

36. The optical fiber of any one of the examples above, wherein the fiber is configured to provide normal dispersion across a wavelength band of at least 90 nm at a wavelength above 1500 nm.

37. The optical fiber of any one of the examples above, wherein the fiber is configured to provide normal dispersion across a wavelength band of at least 90 nm at a wavelength above 1540 nm.

38. A Raman fiber amplifier comprising the optical fiber of any one of examples 1 to 37.

39. The Raman fiber amplifier of example 38, configured to amplify light having a wavelength between 1450 nm and 2500 nm.

40. A fiber laser source comprising the optical fiber of any one of examples 1 to 35.

ADDITIONAL INFORMATION

All elements, parts and steps described herein are preferably included. It is to be understood that any of these elements, parts and steps may be replaced by other elements, parts and steps or deleted altogether as will be obvious to those skilled in the art.

The foregoing description of the technology has been presented for purposes of illustration and description and is not intended to be exhaustive or to limit the technology to the precise form disclosed. Many modifications and variations are possible in light of the above teaching. The embodiments disclosed were meant only to explain the principles of the technology and its practical application to thereby enable others skilled in the art to best use the technology in various embodiments and with various modifications suited to the particular use contemplated. The scope of the technology is to be defined by the following claims.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. An optical fiber, comprising:
   a cladding;
   a main core;
   at least one side core having an index of refraction that is higher and a diameter that is smaller than that of said main core such that the modes of said at least one side core have an effective refractive index that varies faster with wavelength than the effective refractive index of modes of said main core, wherein said main core and said at least one side core are embedded within said cladding, wherein said at least one side core is located a distance from said main core such that the modes of said at least one side core and the modes of said main core hybridize into two supermodes having different dispersion than said modes of said main core and said modes of said at least one the side core, wherein when said main core and said at least one side core are placed in proximity, their modes hybridize around the wavelength at which their effective indices coincide, yielding supermodes with qualitatively different dispersion compared to the modes of said main core and said at least one side core isolated one from another; and
   a secondary cladding surrounding said cladding.

2. The optical fiber of claim 1, wherein said optical fiber is characterized as comprising a large mode area (LMA) fiber.

3. The optical fiber of claim 1, wherein said cladding includes scattering elements to enhance pump absorption in cladding pumped fiber amplifiers.

4. The optical fiber of claim 1, wherein said cladding contains scalloped outer edges.

5. The optical fiber of claim 1, wherein said secondary cladding has been F-doped.

6. The optical fiber of claim 1, wherein the effect wherein their modes hybridize is most pronounced if the wavelength dependence of the effective indices of the modes of the isolated main core and said at least one side core are dissimilar.

7. The optical fiber of claim 6, wherein if said main core comprises a mode having a weak (shallow) wavelength dependence and said at least one side core comprises a mode having a strong (steep) wavelength dependence, one of the two supermodes develops an enhanced anomalous dispersion feature, making it undesirable and wherein the other of the two supermodes develops an enhanced normal dispersion feature, which is desirable for suppressing Modulation Instability at eye-safe wavelengths in a silica fiber.

8. The optical fiber of claim 6, wherein the two supermodes have different levels of overlap with said main core at different wavelengths, with the result that the operating wavelength is to the longer wavelength side of the enhanced normal dispersion feature.

9. An optical fiber, comprising:
a cladding;
a main core;
at least one side core having an index of refraction that is higher and a diameter that is smaller than that of said main core such that the modes of said at least one side core have an effective refractive index that varies faster with wavelength than the effective refractive index of modes of said main core, wherein said main core and said at least one side core are embedded within said cladding, wherein said at least one side core is located a distance from said main core such that the modes of said at least one side core and the modes of said main core hybridize into two supermodes having different dispersion than said modes of said main core and said modes of said at least one the side core, wherein said optical fiber is characterized as comprising a large mode area (LMA) fiber, and wherein said LMA fiber comprises normal dispersion around 1530-1650 nm for one of the supermodes; and
a secondary cladding surrounding said cladding.

10. The optical fiber of claim 9, wherein said LMA fiber is configured for high power Raman amplification at known eye safer wavelengths.

11. The optical fiber of claim 9, wherein said LMA fiber is useful for high power Raman fiber amplification in spectral regions (including eye safer wavelengths) where other fibers would have anomalous dispersion.

12. The optical fiber of claim 9, wherein said LMA fiber is a laser source configured for an application selected from the group consisting of telecommunication, additive manufacturing, remote sensing and power beaming.

13. The optical fiber of claim 9, wherein said LMA fiber comprises a mode diameter of >20 microns.

14. The optical fiber of claim 9, wherein said LMA fiber is configured with a laser gain media selected from the group consisting of Er, Tm and Nd.

15. An optical fiber, comprising:
a cladding;
a main core;
at least one side core having an index of refraction that is higher and a diameter that is smaller than that of said main core such that the modes of said at least one side core have an effective refractive index that varies faster with wavelength than the effective refractive index of modes of said main core, wherein said main core and said at least one side core are embedded within said cladding, wherein said at least one side core is located a distance from said main core such that the modes of said at least one side core and the modes of said main core hybridize into two supermodes having different dispersion than said modes of said main core and said modes of said at least one the side core, wherein said fiber comprises normal dispersion over at least a 100 nm wavelength range for one of the supermodes; and
a secondary cladding surrounding said cladding.

16. An optical fiber, comprising:
a cladding;
a main core;
at least one side core having an index of refraction that is higher and a diameter that is smaller than that of said main core such that the modes of said at least one side core have an effective refractive index that varies faster with wavelength than the effective refractive index of modes of said main core, wherein said main core and said at least one side core are embedded within said cladding, wherein said at least one side core is located a distance from said main core such that the modes of said at least one side core and the modes of said main core hybridize into two supermodes having different dispersion than said modes of said main core and said modes of said at least one the side core, wherein said main core is made from Ge-doped fused silica, wherein said at least one side core is made from standard preforms for multimode GRIN fiber; and
a secondary cladding surrounding said cladding.

17. An optical fiber, comprising:
a cladding;
a main core;
at least one side core having an index of refraction that is higher and a diameter that is smaller than that of said main core such that the modes of said at least one side core have an effective refractive index that varies faster with wavelength than the effective refractive index of modes of said main core, wherein said main core and said at least one side core are embedded within said cladding, wherein said at least one side core is located a distance from said main core such that the modes of said at least one side core and the modes of said main core hybridize into two supermodes having different dispersion than said modes of said main core and said modes of said at least one the side core, wherein the resulting dispersion of said supermodes is optimized; and
a secondary cladding surrounding said cladding.

18. The optical fiber of claim 17, wherein said dispersion is optimized by adjusting the following parameters: (1) regarding the index and size of said two components, defining their modes' effective indices, their wavelength dependence, and the wavelength at which they are coincident, wherein (a) a main core of large size and low index has a shallow wavelength dependence, making it relatively insensitive to variations in size or index, (b) a side core of small size and high index has a steep wavelength dependence, increasing the effect on dispersion and making it relatively sensitive to variations in size or index, which are desirable features.

19. The optical fiber of claim 18, wherein regarding the separation of the two components, affecting the magnitude and width of the supermodes' enhanced dispersion features (a) a small separation yields wide and small magnitude features and (b) a large separation yields narrow and large magnitude features.

20. An optical fiber, comprising:
   a cladding;
   a main core;
   at least one side core having an index of refraction that is higher and a diameter that is smaller than that of said main core such that the modes of said at least one side core have an effective refractive index that varies faster with wavelength than the effective refractive index of modes of said main core, wherein said main core and said at least one side core are embedded within said cladding, wherein said at least one side core is located a distance from said main core such that the modes of said at least one side core and the modes of said main core hybridize into two supermodes having different dispersion than said modes of said main core and said modes of said at least one the side core;
   a secondary cladding surrounding said cladding; and
   a ring that surrounds the main core and the at least one side core, the ring having an index of refraction greater than an index of refraction of the cladding, the ring configured to suppress propagation of higher order modes in the main core.

* * * * *